(12) United States Patent
Lee et al.

(10) Patent No.: US 10,736,099 B2
(45) Date of Patent: Aug. 4, 2020

(54) RESOLVING SLOT FORMAT CONFLICTS FOR WIRELESS SYSTEMS

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Tao Luo, San Diego, CA (US); Juan Montojo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/103,506

(22) Filed: Aug. 14, 2018

(65) Prior Publication Data

US 2019/0059084 A1 Feb. 21, 2019

Related U.S. Application Data

(60) Provisional application No. 62/547,619, filed on Aug. 18, 2017.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0007* (2013.01); *H04L 5/0044* (2013.01);
(Continued)

(58) Field of Classification Search
CPC ........... H04W 72/0466; H04W 72/005; H04W 72/0453; H04W 72/121; H04L 5/0007; H04L 5/0044; H04L 5/0091; H04L 5/1469
See application file for complete search history.

(56) References Cited

U.S. PATENT DOCUMENTS

2017/0332396 A1* 11/2017 Liao ................... H04L 27/2607
2018/0309513 A1* 10/2018 Kim ..................... H04B 7/2643
(Continued)

OTHER PUBLICATIONS

CMCC: "UE Behaviour Related to Dynamic and Semi-static Configured Resources", 3GPP Draft; R1-1710781, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299985, Retrieved from the Internet: URL:http://www.3gpp.org/ftp/Meetings_3GPP_SYNC/RAN1/Docs/ [retrieved on Jun. 26, 2017], 3 pages.
(Continued)

*Primary Examiner* — Duc C Ho
(74) *Attorney, Agent, or Firm* — Steven A. Raney

(57) ABSTRACT

Methods, systems, and devices for wireless communication are described. A base station may transmit or otherwise indicate a semi-static slot format configuration and a dynamic slot format configuration to a user equipment (UE). The UE may determine a slot format configuration based on the received semi-static and dynamic slot format configurations. In some cases, the UE may replace certain resources of the semi-static slot format configuration with resources from the dynamic slot format configuration depending on a certain embodiment. Additionally or alternatively, the base station may transmit an anchor slot configuration to the UE, which may indicate which resources of the semi-static slot format configuration can be overridden or replaced by the dynamic slot format configuration.

69 Claims, 19 Drawing Sheets

(51) Int. Cl.
*H04L 5/14* (2006.01)
*H04W 72/00* (2009.01)
*H04W 72/12* (2009.01)

(52) U.S. Cl.
CPC .......... *H04L 5/0091* (2013.01); *H04L 5/1469* (2013.01); *H04W 72/005* (2013.01); *H04W 72/0453* (2013.01); *H04W 72/121* (2013.01)

(56) References Cited

U.S. PATENT DOCUMENTS

2018/0324689 A1* 11/2018 Li .................. H04W 72/121
2018/0368199 A1* 12/2018 Zeng ................ H04B 7/2643

OTHER PUBLICATIONS

International Search Report and Written Opinion—PCT/US2018/046927—ISA/EPO—dated Oct. 18, 2018.

Mediatek Inc: "Contents of group-common PDCCH", 3GPP Draft; R1-1710793 Contents of Group-Common PDCCH_Final, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 17, 2017, XP051305221, Retrieved from the Internet: URL:http://www.3gpp.org/ftp/tsg_ran/WG1_RL1/TSGR1_AH/NR_AH_1706/Docs/ [retrieved on Jun. 17, 2017], 4 pages.

CATT: "[89-20] email discussion: Group-common PDCCH for NR," 3GPP Draft; R1-1710968, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 28, 2017, XP051305938, 22 pages, Retrieved from the Internet: URL:http://www.3gpp.org/ftp/tsg_ran/WG1_RL1/TSGR1_AH/NR_AH_1706/Docs/ [retrieved on Jun. 28, 2017].

\* cited by examiner

RESOLVING SLOT FORMAT CONFLICTS FOR WIRELESS SYSTEMS

CROSS REFERENCES

The present application for patent claims priority to U.S. Provisional Patent Application No. 62/547,619 by LEE, et al., entitled "Resolving Slot Format Conflicts For Wireless systems," filed Aug. 18, 2017, assigned to the assignee hereof and expressly incorporated by reference herein in its entirety.

BACKGROUND

The following relates generally to wireless communication, and more specifically to resolving slot format conflicts for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may transmit slot format configurations to a UE for subsequent communications. The slot formats may indicate a combination of uplink, downlink, reserved, unknown, or blank resources. In some cases, the base station may transmit two or more slot format configurations (e.g., simultaneously or subsequent to one another) to the UE, where the configurations contain conflicting slot formats. Because of the conflicting slot formats, the UE may inefficiently allocate resources or may be unable to determine a suitable slot format to use for communication with the base station. More efficient techniques for configuring slot formats are desired.

SUMMARY

The described techniques relate to improved methods, systems, devices, or apparatuses that support resolving slot format conflicts for wireless systems. Generally, the described techniques provide for transmission of a first slot format configuration and a second slot format configuration for a first slot for communication with a user equipment (UE). The first and second slot format configurations, or indications of the same, may be received by a UE and used to determine a slot format for the first slot. The first slot format configuration may be a semi-static slot configuration, and the second slot format configuration may be a dynamic slot configuration. In some cases, the UE may identify a symbol type for each of a set of symbols for the slot format for the first slot. For example, the UE may replace flexible symbols indicated by the semi-static slot configuration with respective symbols indicated by the dynamic slot configuration. In other examples, the UE may replace symbols indicated by the semi-static slot configuration with corresponding reserved symbol types indicated by the dynamic slot configuration and replace flexible symbols indicated by the semi-static slot configuration with respective symbols indicated by the dynamic slot configuration. In other examples, the UE may replace all symbols indicated by the semi-static slot configuration with symbol types for respective symbols indicated by the dynamic slot configuration. The UE and a base station may communicate over the set of symbols of the first slot according to the determined slot format.

In some examples, a network node may transmit an anchor configuration for a set of slots including the first slot, the anchor configuration indicating a set of anchor slots, a set of soft anchor slots, and a set of non-anchor slots for the set of slots, where the determined slot format for the first slot is determined based on the anchor configuration. For example, the first slot may correspond to an anchor slot, and the UE may determine the slot format for the first slot by determining symbol types for symbols of the first slot based on only the first slot format configuration. In other examples, the first slot may correspond to a non-anchor slot, and the UE may determine the slot format for the first slot by determining symbol types for symbols of the first slot based at least in part on the second slot format configuration. In still other examples, an indication may be received by the UE, indicating that an anchor slot may be converted to a non-anchor slot. Such a converted slot is referenced as a soft slot.

A method of wireless communication is described. The method may include identifying, by a UE, a first slot format configuration for a first slot for communication with a base station, receiving, from the base station, an indication of a second slot format configuration for the first slot, determining a slot format for the first slot based on the first and second slot format configurations, and communicating with the base station over a set of symbols of the first slot according to the determined slot format.

An apparatus for wireless communication is described. The apparatus may include means for identifying, by a UE, a first slot format configuration for a first slot for communication with a base station, means for receiving, from the base station, an indication of a second slot format configuration for the first slot, means for determining a slot format for the first slot based on the first and second slot format configurations, and means for communicating with the base station over a set of symbols of the first slot according to the determined slot format.

Another apparatus for wireless communication is described. The apparatus may include a processor, memory in electronic communication with the processor, and instructions stored in the memory. The instructions may be operable to cause the processor to identify, by a UE, a first slot format configuration for a first slot for communication with a base station, receive, from the base station, an indication of a second slot format configuration for the first slot, determine a slot format for the first slot based on the first and second slot format configurations, and communicate with the base station over a set of symbols of the first slot according to the determined slot format.

A non-transitory computer readable medium for wireless communication is described. The non-transitory computer-readable medium may include instructions operable to cause a processor to identify, by a UE, a first slot format configuration for a first slot for communication with a base station, receive, from the base station, an indication of a second slot format configuration for the first slot, determine a slot format for the first slot based on the first and second slot format configurations, and communicate with the base station over a set of symbols of the first slot according to the determined slot format.

In some examples of the method, apparatus, and non-transitory computer-readable medium described above, the first slot format configuration may be a semi-static slot configuration. In some examples of the method, apparatus, and non-transitory computer-readable medium described above, the second slot format configuration may be a dynamic slot configuration.

In some examples of the method, apparatus, and non-transitory computer-readable medium described above, determining the slot format includes identifying a symbol type for each of the set of symbols based on the semi-static slot configuration and the dynamic slot configuration.

In some examples of the method, apparatus, and non-transitory computer-readable medium described above, identifying the symbol type for each of the set of symbols includes replacing flexible symbols indicated by the semi-static slot configuration with symbol types for respective symbols indicated by the dynamic slot configuration and maintaining symbols other than the replaced flexible symbols with symbol types indicated by the semi-static slot configuration.

Some examples of the method, apparatus, and non-transitory computer-readable medium described above may further include processes, features, means, or instructions for replacing symbols indicated by the semi-static slot configuration with corresponding reserved symbol types indicated by the dynamic slot configuration.

In some examples of the method, apparatus, and non-transitory computer-readable medium described above, identifying the symbol type for each of the set of symbols includes replacing all symbols indicated by the semi-static slot configuration with symbol types for respective symbols indicated by the dynamic slot configuration.

In some examples of the method, apparatus, and non-transitory computer-readable medium described above, determining the slot format includes combining a first portion of symbol types indicated by the first slot format configuration with a second portion of symbol types indicated by the second slot format configuration to obtain the determined slot format, where the first slot format configuration may be a semi-static slot configuration and where the second slot format configuration may be a dynamic slot configuration.

In some examples of the method, apparatus, and non-transitory computer-readable medium described above, the second portion of symbol types may be limited to symbols that correspond to flexible symbols indicated by the semi-static slot configuration.

In some examples of the method, apparatus, and non-transitory computer-readable medium described above, the second portion of symbol types may be limited to reserved symbols indicated by the dynamic slot configuration.

In some examples of the method, apparatus, and non-transitory computer-readable medium described above, the second portion of symbol types includes all symbols indicated by the dynamic slot configuration.

In some examples of the method, apparatus, and non-transitory computer-readable medium described above, identifying the first slot format configuration includes receiving, from the base station, a semi-static slot configuration indicating a set of downlink symbols, a set of uplink symbols, a set of reserved symbols, and a set of flexible symbols for the first slot.

In some examples of the method, apparatus, and non-transitory computer-readable medium described above, the semi-static slot configuration may be received via a radio resource control (RRC) message or a broadcast message.

In some examples of the method, apparatus, and non-transitory computer-readable medium described above, the semi-static slot configuration indicates one or more sets of symbol types for the set of symbols, each of the one or more sets of symbol types corresponding to a different frequency range.

In some examples of the method, apparatus, and non-transitory computer-readable medium described above, each frequency range includes a bandwidth part (BWP) of a frequency band.

In some examples of the method, apparatus, and non-transitory computer-readable medium described above, each frequency range includes a component carrier (CC) of a frequency band.

In some examples of the method, apparatus, and non-transitory computer-readable medium described above, receiving an indication of the second slot format configuration includes receiving, from the base station, an indication of a dynamic slot configuration indicating a set of downlink symbols, a set of uplink symbols, a set of reserved symbols, and a set of blank symbols for the first slot.

In some examples of the method, apparatus, and non-transitory computer-readable medium described above, the dynamic slot configuration indication may be received via a common physical downlink control channel (PDCCH).

In some examples of the method, apparatus, and non-transitory computer-readable medium described above, the common PDCCH corresponds to a group of UEs.

Some examples of the method, apparatus, and non-transitory computer-readable medium described above may further include processes, features, means, or instructions for receiving, from a network node, an anchor configuration for a set of slots including the first slot, the anchor configuration indicating a set of anchor slots, a set of soft anchor slots, and a set of non-anchor slots for the set of slots, where the determined slot format for the first slot may be determined based on the anchor configuration.

In some examples of the method, apparatus, and non-transitory computer-readable medium described above, the first slot corresponds to an anchor slot. In some examples of the method, apparatus, and non-transitory computer-readable medium described above, determining the slot format for the first slot includes determining symbol types for symbols of the first slot based on only the first slot format configuration.

Some examples of the method, apparatus, and non-transitory computer-readable medium described above may further include processes, features, means, or instructions for receiving an indication that the first slot may be to be converted from an anchor slot to a non-anchor slot, where, as a non-anchor slot, symbol types of the first slot may be determined based on at least in part on the second slot format configuration.

In some examples of the method, apparatus, and non-transitory computer-readable medium described above, the indication may be received via downlink control information (DCI) or a media access control (MAC) control element (MAC-CE).

In some examples of the method, apparatus, and non-transitory computer-readable medium described above, the indication may be enabled based on a semi-persistent activation message or a timer.

In some examples of the method, apparatus, and non-transitory computer-readable medium described above, the first slot corresponds to a non-anchor slot. In some examples of the method, apparatus, and non-transitory computer-readable medium described above, determining the slot format for the first slot includes determining symbol types for symbols of the first slot based on the second slot format configuration.

A method of wireless communication is described. The method may include transmitting, by a base station, a first slot format configuration for a first slot for communication with a UE, transmitting, to the UE, an indication of a second slot format configuration for the first slot, and communicating with the UE over a set of symbols of the first slot according a slot format based on the first slot format configuration and the second slot format configuration.

An apparatus for wireless communication is described. The apparatus may include means for transmitting, by a base station, a first slot format configuration for a first slot for communication with a UE, means for transmitting, to the UE, an indication of a second slot format configuration for the first slot, and means for communicating with the UE over a set of symbols of the first slot according a slot format based on the first slot format configuration and the second slot format configuration.

Another apparatus for wireless communication is described. The apparatus may include a processor, memory in electronic communication with the processor, and instructions stored in the memory. The instructions may be operable to cause the processor to transmit, by a base station, a first slot format configuration for a first slot for communication with a UE, transmit, to the UE, an indication of a second slot format configuration for the first slot, and communicate with the UE over a set of symbols of the first slot according a slot format based on the first slot format configuration and the second slot format configuration.

A non-transitory computer readable medium for wireless communication is described. The non-transitory computer-readable medium may include instructions operable to cause a processor to transmit, by a base station, a first slot format configuration for a first slot for communication with a UE, transmit, to the UE, an indication of a second slot format configuration for the first slot, and communicate with the UE over a set of symbols of the first slot according a slot format based on the first slot format configuration and the second slot format configuration.

In some examples of the method, apparatus, and non-transitory computer-readable medium described above, the first slot format configuration may be a semi-static slot configuration. In some examples of the method, apparatus, and non-transitory computer-readable medium described above, the second slot format configuration may be a dynamic slot configuration.

Some examples of the method, apparatus, and non-transitory computer-readable medium described above may further include processes, features, means, or instructions for identifying a symbol type for each of the set of symbols based on the semi-static and dynamic slot configurations.

In some examples of the method, apparatus, and non-transitory computer-readable medium described above, transmitting the first slot format configuration includes transmitting a semi-static slot configuration indicating a set of downlink symbols, a set of uplink symbols, a set of reserved symbols, and a set of flexible symbols for the first slot.

In some examples of the method, apparatus, and non-transitory computer-readable medium described above, the semi-static slot configuration may be transmitted via a RRC message or a broadcast message.

In some examples of the method, apparatus, and non-transitory computer-readable medium described above, the semi-static slot configuration indicates one or more sets of symbol types for the set of symbols, each of the one or more sets of symbol types corresponding to a different frequency range.

In some examples of the method, apparatus, and non-transitory computer-readable medium described above, each frequency range includes a BWP of a frequency band.

In some examples of the method, apparatus, and non-transitory computer-readable medium described above, each frequency range includes a CC of a frequency band.

In some examples of the method, apparatus, and non-transitory computer-readable medium described above, transmitting the second slot format configuration includes transmitting a dynamic slot configuration indicating a set of downlink symbols, a set of uplink symbols, a set of reserved symbols, and a set of blank symbols for the first slot.

In some examples of the method, apparatus, and non-transitory computer-readable medium described above, the dynamic slot configuration may be transmitted via a common PDCCH.

In some examples of the method, apparatus, and non-transitory computer-readable medium described above, the common PDCCH corresponds to a group of UEs.

Some examples of the method, apparatus, and non-transitory computer-readable medium described above may further include processes, features, means, or instructions for receiving, from a network node, an anchor configuration for a set of slots including the first slot, the anchor configuration indicating a set of anchor slots, a set of soft anchor slots, and a set of non-anchor slots for the set of slots, where the slot format for the first slot may be based on the anchor configuration.

In some examples of the method, apparatus, and non-transitory computer-readable medium described above, the first slot corresponds to an anchor slot. In some examples of the method, apparatus, and non-transitory computer-readable medium described above, the slot format for the first slot may be based on only symbol types for the set of symbols as indicated by the first slot format configuration.

In some examples of the method, apparatus, and non-transitory computer-readable medium described above, the first slot corresponds to a soft anchor slot. In some examples of the method, apparatus, and non-transitory computer-readable medium described above, the slot format for the first slot may be based on only symbol types for the set of symbols as indicated by the second slot format configuration.

Some examples of the method, apparatus, and non-transitory computer-readable medium described above may further include processes, features, means, or instructions for indicating one or more soft anchor slots via DCI or a MAC-CE.

In some examples of the method, apparatus, and non-transitory computer-readable medium described above, the first slot corresponds to a non-anchor slot. In some examples of the method, apparatus, and non-transitory computer-readable medium described above, the slot format for the first slot may be based on only flexible or reserved symbol types for a subset of symbols as indicated by the first slot format configuration that may be replaced with respective symbol types as indicated by the second slot format configuration.

DETAILED DESCRIPTION

Figure 1:
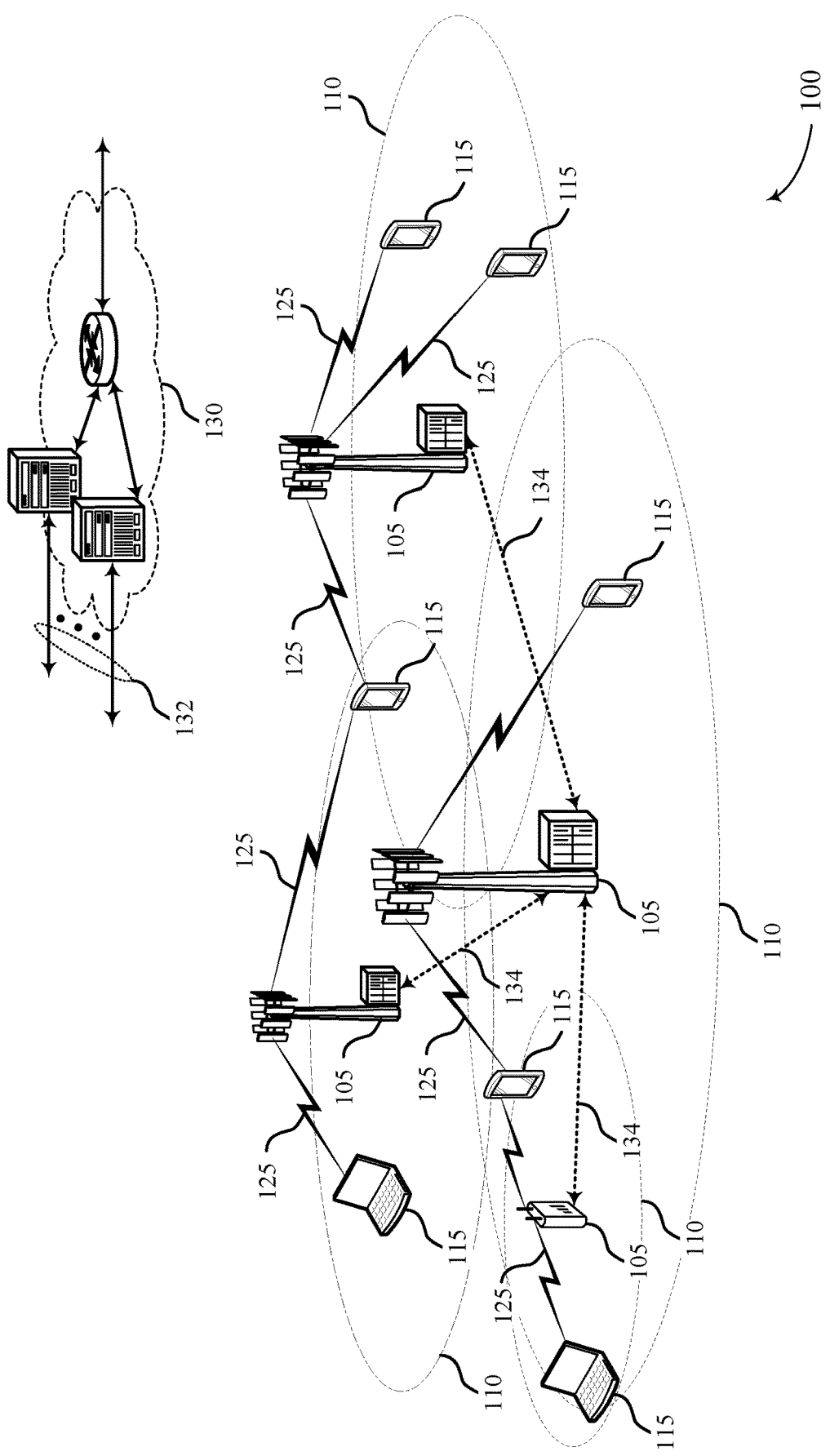
FIG. 1 illustrates an example of a wireless communications system that supports resolving slot format conflicts for wireless systems in accordance with aspects of the present disclosure.

A base station may transmit one or more slot format configurations or indications thereof to a user equipment (UE) for subsequent communications. The slot format configurations may include a combination of uplink, downlink, flexible, reserved, and blank resources. The base station and the UE may utilize the flexible resources for downlink, uplink, or blank resources. The reserved symbols may indicate resources that are reserved for future compatibility (e.g., for future radio access technologies or future wireless communications systems). The blank resources may indicate unused resources. The base station may transmit the slot format configurations via semi-static and/or dynamic signaling.

In some cases, the base station may transmit a semi-static slot format configuration through a type of broadcast or control message (e.g., radio resource control (RRC)). The semi-static format configuration may define resources in both time and frequency domains. The time domain may not contain a mixture of uplink and downlink resources within a same symbol (e.g., uplink and downlink resources may not be located within a common symbol). The frequency domain may include a subset of the bandwidth for the slot format configuration (e.g., a bandwidth part (BWP) or a component carrier (CC)). Additionally or alternatively, the base station may transmit a dynamic slot format configuration through a downlink control channel (e.g., group common physical downlink control channel (PDCCH)). The dynamic slot format configuration may define resources in a time domain (e.g., the resources may remain the same across a symbol for all frequencies).

In some cases, the base station may transmit a semi-static slot format configuration and a dynamic slot format configuration to the UE, or indications of the same. The UE may determine a slot format configuration based on the received or determined semi-static and dynamic slot format configurations. In one embodiment, the UE may replace flexible resources of the semi-static slot format configuration with corresponding resources from the dynamic slot format configuration. In another embodiment, the UE may replace the flexible resources of the semi-static slot format configuration with corresponding resources from the dynamic slot format configuration, and reserved/unknown resources of the dynamic slot format configuration may override corresponding resources of the semi-static slot format configuration. In another embodiment, the UE may replace all resources of the semi-static slot format configuration with resources from the dynamic slot format configuration.

Additionally or alternatively, the base station may transmit an anchor configuration to the UE via higher layer signaling (e.g., RRC) to determine a slot format configuration when semi-static and dynamic slot format configurations are transmitted. The anchor configuration may indicate a set of anchor slots, a set of soft anchor slots, or a set of non-anchor slots. Anchor slots may be fixed by the semi-static slot format configuration. Soft anchor slots may be a subset of the anchor slots that include resources that correspond to the dynamic slot format configuration. For example, the soft anchor slots may indicate anchor slots that may be converted to non-anchor slots after an enabling activation (e.g., enabled via semi-persistent activation/deactivation or activated via a timer). The activation may be transmitted via downlink control information (DCI) or media access control (MAC) control element (MAC-CE). Non-anchor slots may indicate resources that correspond to the dynamic slot format configuration.

Aspects of the disclosure are initially described in the context of wireless communications systems. Slot configurations, anchor configuration, and a process flow are then described. Aspects of the disclosure are further illustrated by and described with reference to apparatus diagrams, system diagrams, and flowcharts that relate to resolving slot format conflicts for wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a base station 105 may transmit one or more slot format configurations to a UE 115 (or indications of the same) for subsequent communications. A slot format configuration may include a number of different types of time intervals (e.g., uplink time intervals (U), downlink time intervals (D), or special (S) time intervals) that a base station 105 may indicate to a UE 115. The time interval may be a subframe, slot, mini-slot, symbol, or any other duration. Examples of slot format configurations are shown in Table 1 below, however, any other combination of different types of time intervals and any number of time intervals may be considered without departing from the scope of the present disclosure.

TABLE 1

| Uplink-Downlink Configuration | Downlink to Uplink Switch Periodicity | Time Interval | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The special time intervals may indicate time intervals utilized for guard periods for switching between downlink and uplink time intervals. The slot format configurations may further include a combination of uplink, downlink, flexible, reserved, and blank resources. The base station 105 and the UE 115 may utilize the flexible resources for downlink, uplink, or blank resources. The reserved symbols may indicate resources that are reserved for future compatibility (e.g., for future radio access technologies or future wireless communications systems). The blank resources may indicate unused resources. The base station 105 may transmit the slot format configurations via semi-static and/or dynamic signaling.

In some cases, the base station 105 may transmit a semi-static slot format configuration through a type of broadcast message or control message (e.g., RRC). The semi-static format configuration may define resources in both time and frequency domains. The resources in the time domain may not contain a mixture of uplink and downlink resources within a same symbol (e.g., uplink and downlink resources may not be located within a common symbol). The resources in the frequency domain may include a subset of the bandwidth for the slot format configuration (e.g., a BWP or a CC). Additionally or alternatively, the base station may transmit a dynamic slot format configuration, or an indication of a dynamic slot format configuration, through a downlink control channel (e.g., a group common PDCCH). The dynamic slot format configuration may define resources in a time domain (e.g., the resources may remain the same across a time symbol for all frequencies). In some cases, the base station 105 may transmit a semi-static slot format configuration and a dynamic slot format configuration to the UE 115.

Wireless communications system 100 may support efficient techniques for the UE 115 to determine a slot format configuration based on the received semi-static and dynamic slot format configurations. In some cases, the UE 115 may replace certain resources of the semi-static slot format configuration with resources from the dynamic slot format configuration depending on a certain embodiment. Additionally or alternatively, the base station 105 may transmit an anchor slot configuration to the UE 115, which may indicate which resources of the semi-static slot format configuration can be overridden or replaced by the dynamic slot format configuration.

Figure 2:
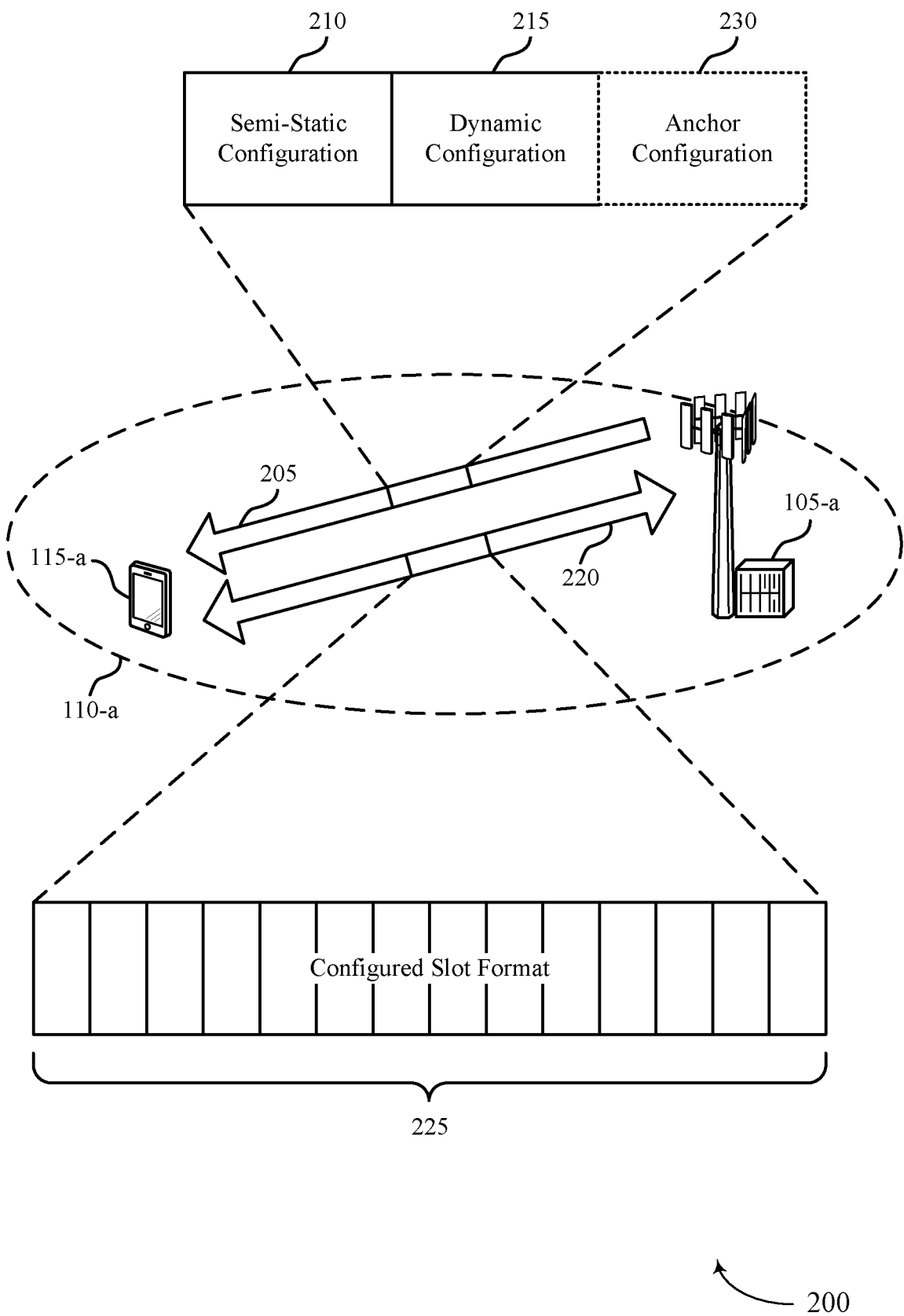
FIG. 2 illustrates an example of a wireless communications system that supports resolving slot format conflicts for wireless systems in accordance with aspects of the present disclosure.

FIG. 2 illustrates an example of a wireless communications system 200 that supports resolving slot format conflicts for wireless systems in accordance with various aspects of the present disclosure. In some examples, wireless communications system 200 may implement aspects of wireless communication system 100. Wireless communications system 200 may include a base station 105-a and a UE 115-a, which may be examples of corresponding base stations 105 and UEs 115 as described with reference to FIG. 1. Base station 105-a may transmit slot format configurations to UE 115-a for subsequent communications on resources of a carrier 205. In some cases, the slot format configurations may include a semi-static slot configuration 210 or a dynamic slot configuration 215. Base station 105-a may transmit both slot configurations (e.g., semi-static slot configuration 210 and dynamic slot configuration 215) to UE 115-a simultaneously (e.g., within a single message) or subsequent to one another (e.g., one configuration sent via RRC during cell acquisition and another configuration sent via DCI at a later time). In some cases, base station 105-a may transmit an actual slot configuration, and in other instances the base station 105-a may transmit an indication of a slot configuration, thus allowing the UE 115-a to determine the indicated slot configuration.

Base station 105-a may transmit semi-static slot configuration 210 via a broadcast message or control message (e.g., RRC). Semi-static slot configuration 210 may include a combination of downlink, uplink, flexible, and reserved resources. The downlink and uplink resources may be utilized for respective downlink and uplink data. The flexible resources may be utilized for downlink, uplink, or blank (e.g., unused) resources. The reserved resources may be reserved for future compatibilities. Additionally, semi-static slot configuration 210 may indicate resources in both time and frequency domains (e.g., resources may vary across time and frequency). In some cases, uplink and downlink resources may not be located on a common time symbol. The indicated frequency domain may include a BWP or portion of resources per CC.

Additionally or alternatively, base station 105-a may indicate or otherwise transmit dynamic slot configuration 215 (e.g., via a common PDCCH sent to a group of UEs 105). Base station 105-a may transmit the group common PDCCH to a group of UEs 115, including UE 115-a. Dynamic slot configuration 215 may include a combination of downlink, uplink, unknown (e.g., reserved), and blank symbols. The downlink and uplink symbols may be utilized for respective downlink and uplink data. The unknown symbols may be reserved for future compatibilities. The blank symbols may indicate unused symbols. Dynamic slot configuration 215 may indicate resources in the time domain (e.g., the resources may remain the same across a time symbol for all frequencies).

UE 115-a may configure a slot format 225 on a carrier 220 based on the received semi-static slot configuration 210 and dynamic slot configuration 215. The configured slot format 225 may include a combination of resources from semi-static slot configuration 210 and dynamic slot configuration 215. For example, UE 115-a may replace the flexible resources of semi-static slot configuration 210 with corresponding resources from dynamic slot configuration 215. In other examples, UE 115-a may replace the flexible resources of semi-static slot configuration 210 with corresponding resources from dynamic slot configuration 215, and reserved/unknown resources of dynamic slot configuration 215 may override corresponding resources of semi-static slot configuration 210. In other examples, UE 115-a may replace all resources of semi-static slot configuration 210 with resources from dynamic slot configuration 215. The configured slot format 225 may include a number of symbols that correspond to the received slot configurations (e.g., 14 symbols).

In some cases, base station 105-*a* may optionally transmit an anchor configuration 230 to UE 115-*a*. UE 115-*a* may configure slot format 225 based in part on the anchor configuration 230. The anchor configuration 230 may indicate a set of anchor slots, a set of soft anchor slots, or a set of non-anchor slots. Anchor slots may be fixed by semi-static slot configuration 210. Soft anchor slots may be a subset of the anchor slots that include resources that correspond to dynamic slot configuration 215. For example, the soft anchor slots may indicate anchor slots that may be converted to non-anchor slots after an enabling activation (e.g., enabled via semi-persistent activation/deactivation or activated via a timer). The activation may be transmitted via DCI or MAC-CE. Non-anchor slots may indicate resources that correspond to the dynamic slot format configuration.

Figure 3:
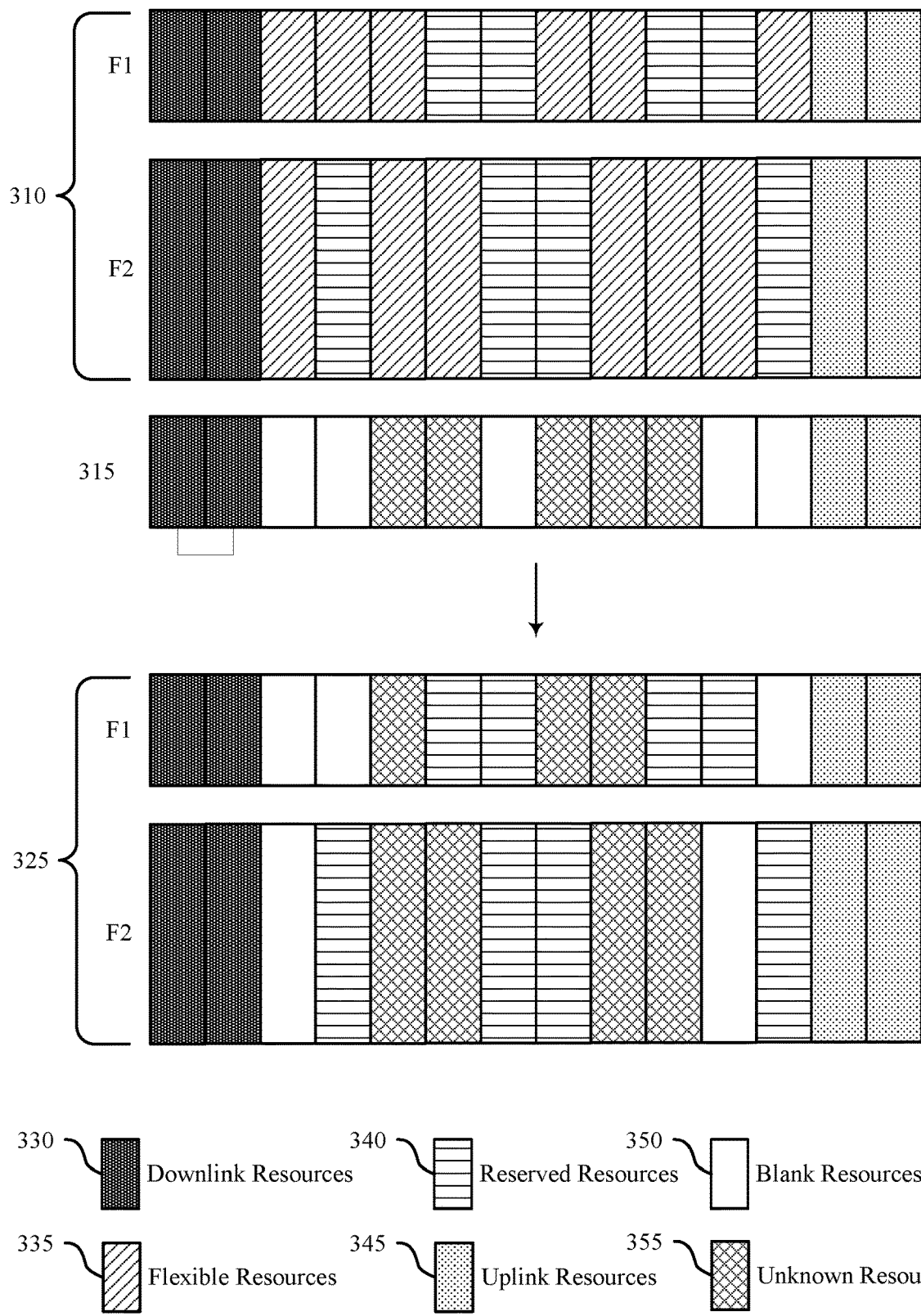
FIG. 3 illustrates an example of a slot configuration that supports resolving slot format conflicts for wireless systems in accordance with aspects of the present disclosure.

FIG. 3 illustrates an example of a slot configuration 300 that supports resolving slot format conflicts for wireless systems in accordance with various aspects of the present disclosure. In some examples, slot configuration 300 may implement aspects of wireless communication systems 100 or 200 as described with reference to FIGS. 1 and 2. A base station 105 may transmit, to a UE 115, a semi-static slot configuration 310 or dynamic slot configuration 315, which may be examples of semi-static slot configurations and dynamic slot configurations as described with reference to FIG. 2. Semi-static slot configuration 310 may include various configurations for different frequency resources (e.g., F1 and F2), which may include BWPs or configurations for different CCs. Additionally, semi-static slot configuration 310 may include a combination of downlink resources 330, flexible resources 335, reserved resources 340, and uplink resources 345. Dynamic slot configuration 315 may indicate a configuration of resources that are the same over all frequency resources. Additionally, dynamic slot configuration 315 may include a combination of downlink resources 330, blank resources 350, unknown/reserved resources 355, and uplink resources 345.

The UE 115 may configure a slot format 325 based on the received semi-static slot configuration 310 and dynamic slot configuration 315. The configured slot format 325 may include configurations for different frequency portions corresponding to the frequency portions indicated by semi-static slot configuration 310 (e.g., F1 and F2). In the example of FIG. 3, the configured slot format 325 may include a combination of resources from semi-static slot configuration 310 and dynamic slot configuration 315, where the flexible resources 335 of semi-static slot configuration 310 have been replaced with corresponding blank resources 350 or unknown/reserved resources 355 from dynamic slot configuration 315.

Although the examples described herein illustrate specific scenarios, it is to be understood that the base station 105 may transmit different semi-static slot configurations 310 and dynamic slot configurations 315 than those described. The UE 115 may configure the slot format 325 accordingly to the received slot configurations.

Additionally, for purposes of illustration, the example of FIG. 3 shows that the dynamic slot configuration 315 includes resource configurations that differ from corresponding non-flexible resources of the semi-static slot configuration 310 (such as reserved resources 340 of the semi-static slot configuration 310). The configured slot format 325 shows that, for these resources, the semi-static slot configuration 310 is maintained (instead of updating the resources to those indicated by the dynamic slot configuration 315). Thus, in the example of FIG. 3, only the flexible resources 335 of semi-static slot configuration 310 are replaced with resources from the dynamic slot configuration 315; other downlink resources 330, reserved resources 340, or uplink resources 345 of the semi-static slot configuration 310 are not replaced with resources from the dynamic slot configuration 315. In some examples, no conflict is allowed between the directional resources (e.g., downlink resources 330 and uplink resources 345) of the semi-static slot configuration 310 and corresponding resources of the dynamic slot configuration 315. In those examples, if a conflict between the directional resources (e.g., downlink resources 330 and uplink resources 345) of the semi-static slot configuration 310 and the corresponding resources of the dynamic slot configuration 315 exists, an error may be declared. An error state would not exist if the directional resources (e.g., downlink resources 330 and uplink resources 345) of the semi-static slot configuration 310 and the corresponding resources of the dynamic slot configuration 315 were the same. In that case, still only the flexible resources 335 of the semi-static slot configuration 310 would be replaced with the corresponding blank resources 350 or unknown/reserved resources 355 from the dynamic slot configuration 315.

Figure 4:
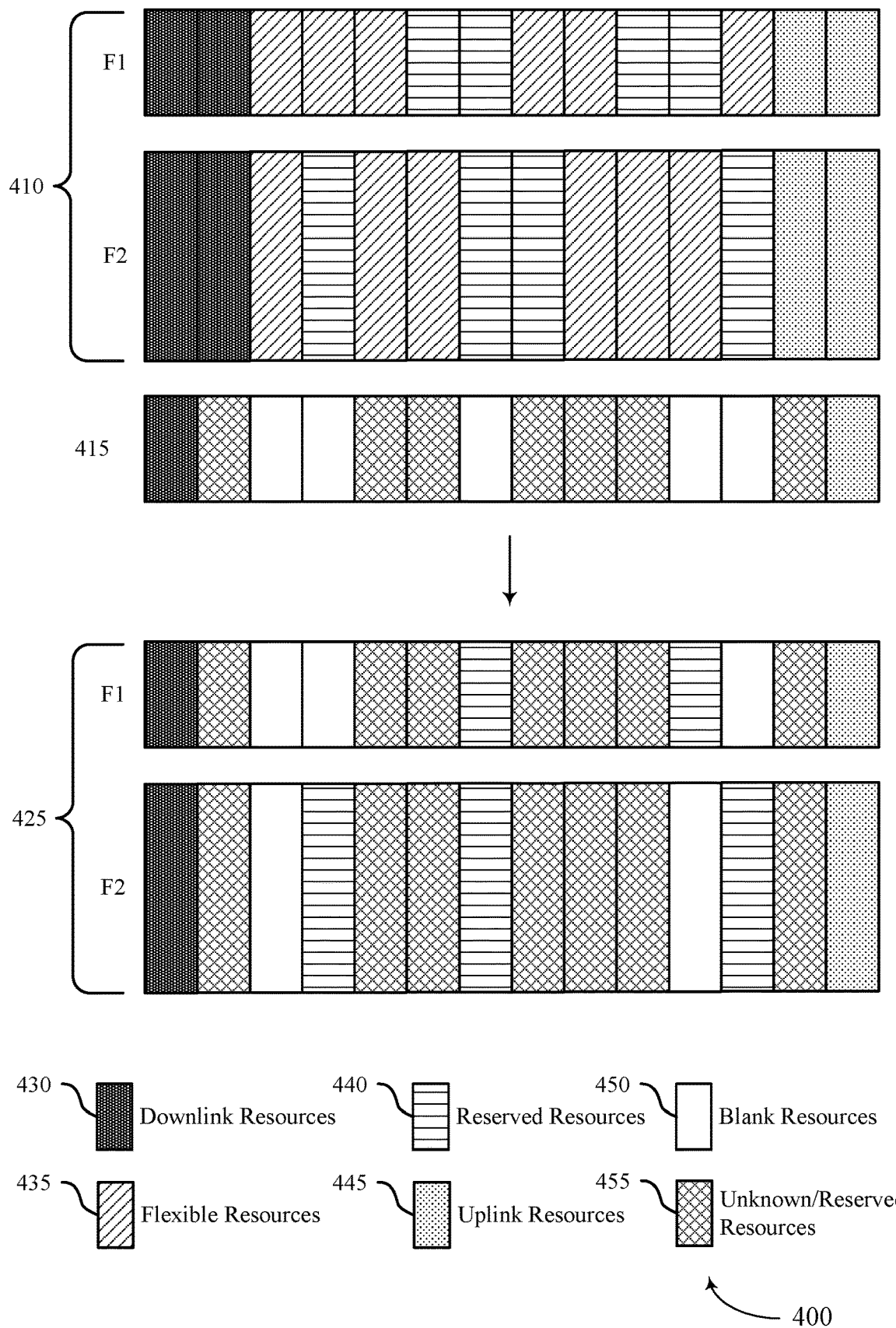
FIG. 4 illustrates an example of a slot configuration that supports resolving slot format conflicts for wireless systems in accordance with aspects of the present disclosure.

FIG. 4 illustrates an example of a slot configuration 400 that supports resolving slot format conflicts for wireless systems in accordance with various aspects of the present disclosure. In some examples, slot configuration 400 may implement aspects of wireless communication systems 100 or 200 as described with reference to FIGS. 1 and 2. A base station 105 may transmit, to a UE 115, a semi-static slot configuration 410 and dynamic slot configuration 415, which may be examples of semi-static slot configurations and dynamic slot configurations as described with reference to FIGS. 2-3. Semi-static slot configuration 410 may include various configurations for different frequency resources (e.g., F1 and F2). Additionally, semi-static slot configuration 410 may include a combination of downlink resources 430, flexible resources 435, reserved resources 440, and uplink resources 445. Dynamic slot configuration 415 may indicate a configuration of resources that are the same over all frequency resources. Additionally, dynamic slot configuration 415 may include a combination of downlink resources 430, blank resources 450, unknown/reserved resources 455, and uplink resources 445.

The UE 115 may configure a slot format 425 based on the received semi-static slot configuration 410 and dynamic slot configuration 415. The configured slot format 425 may include configurations for different frequency portions corresponding to the frequency portions indicated by semi-static slot configuration 410 (e.g., F1 and F2). In the example of FIG. 4, the configured slot format 425 may include a combination of resources from semi-static slot configuration 410 and dynamic slot configuration 415, where the flexible resources 435 of semi-static slot configuration 410 have been replaced with corresponding blank resources 450 or unknown/reserved resources 455 from dynamic slot configuration 415 and the unknown/reserved resources 455 of dynamic slot configuration 415 may override corresponding resources of semi-static slot configuration 410.

Although the examples described herein illustrate specific scenarios, it is to be understood that the base station 105 may transmit different semi-static slot configurations 410 and dynamic slot configurations 415 than those described. The UE 115 may configure the slot format 425 accordingly to the received slot configurations.

Figure 5:
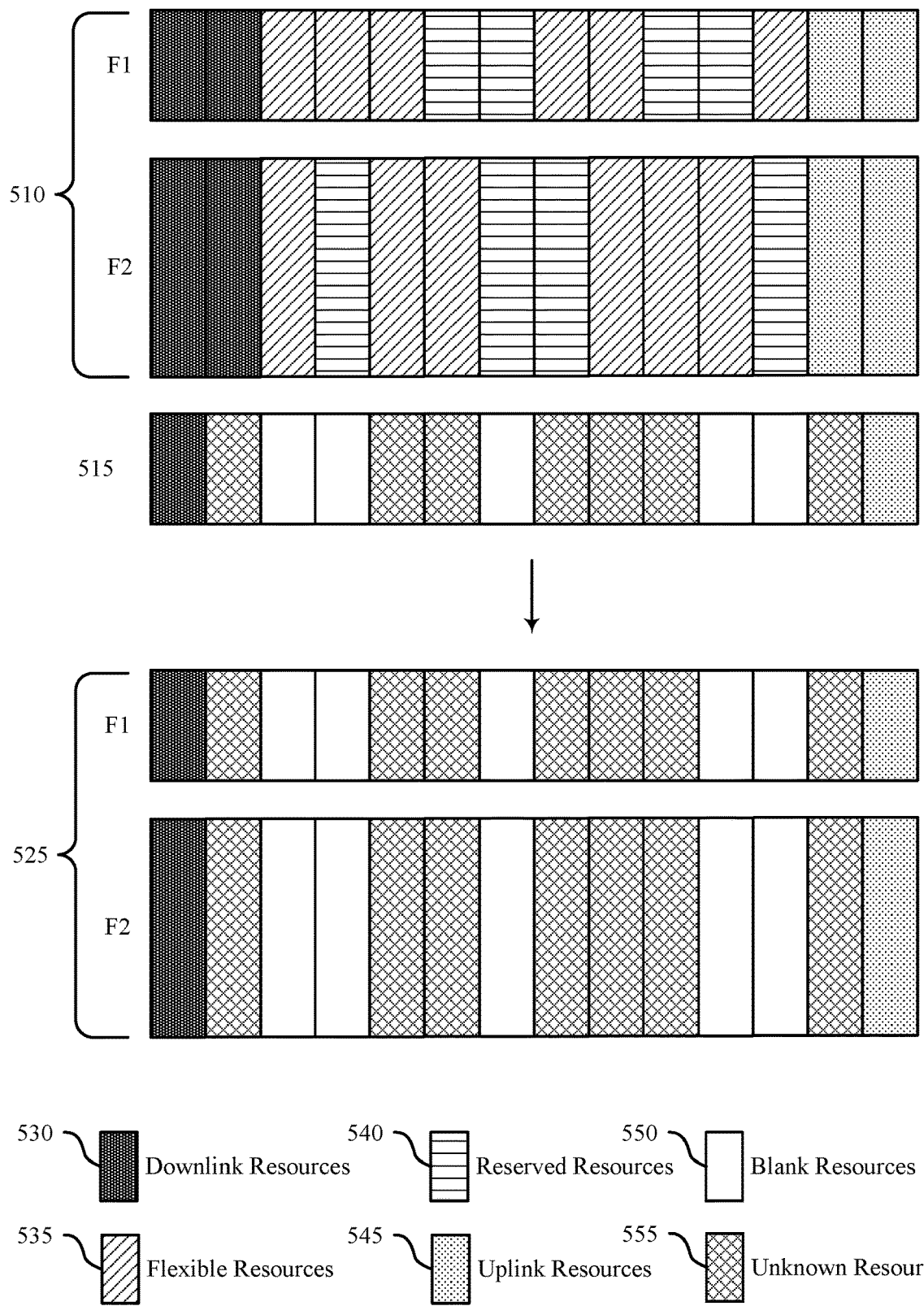
FIG. 5 illustrates an example of a slot configuration that supports resolving slot format conflicts for wireless systems in accordance with aspects of the present disclosure.

FIG. 5 illustrates an example of a slot configuration 500 that supports resolving slot format conflicts for wireless systems in accordance with various aspects of the present disclosure. In some examples, slot configuration 500 may implement aspects of wireless communication systems 100 or 200 as described with reference to FIGS. 1 and 2. A base station 105 may transmit, to a UE 115, a semi-static slot configuration 510 and dynamic slot configuration 515, which may be examples of semi-static slot configurations and dynamic slot configurations as described with reference to FIGS. 2-4. Semi-static slot configuration 510 may include various configurations for different frequency resources (e.g., F1 and F2). Additionally, semi-static slot configuration 510 may include a combination of downlink resources 530, flexible resources 535, reserved resources 540, and uplink resources 545. Dynamic slot configuration 515 may indicate a configuration of resources that are the same over all frequency resources. Additionally, dynamic slot configuration 515 may include a combination of downlink resources 530, blank resources 550, unknown resources 555, and uplink resources 545.

The UE 115 may configure a slot format 525 based on the received semi-static slot configuration 510 and dynamic slot configuration 515. In the example of FIG. 5, the configured slot format 525 may include resources as indicated by dynamic slot configuration 515 for all resources across each time symbol.

Although the examples described herein illustrate specific scenarios, it is to be understood that the base station 105 may transmit different semi-static slot configurations 510 and dynamic slot configurations 515 than those described. The UE 115 may configure the slot format 525 accordingly to the received dynamic slot configuration 515.

Figure 6:
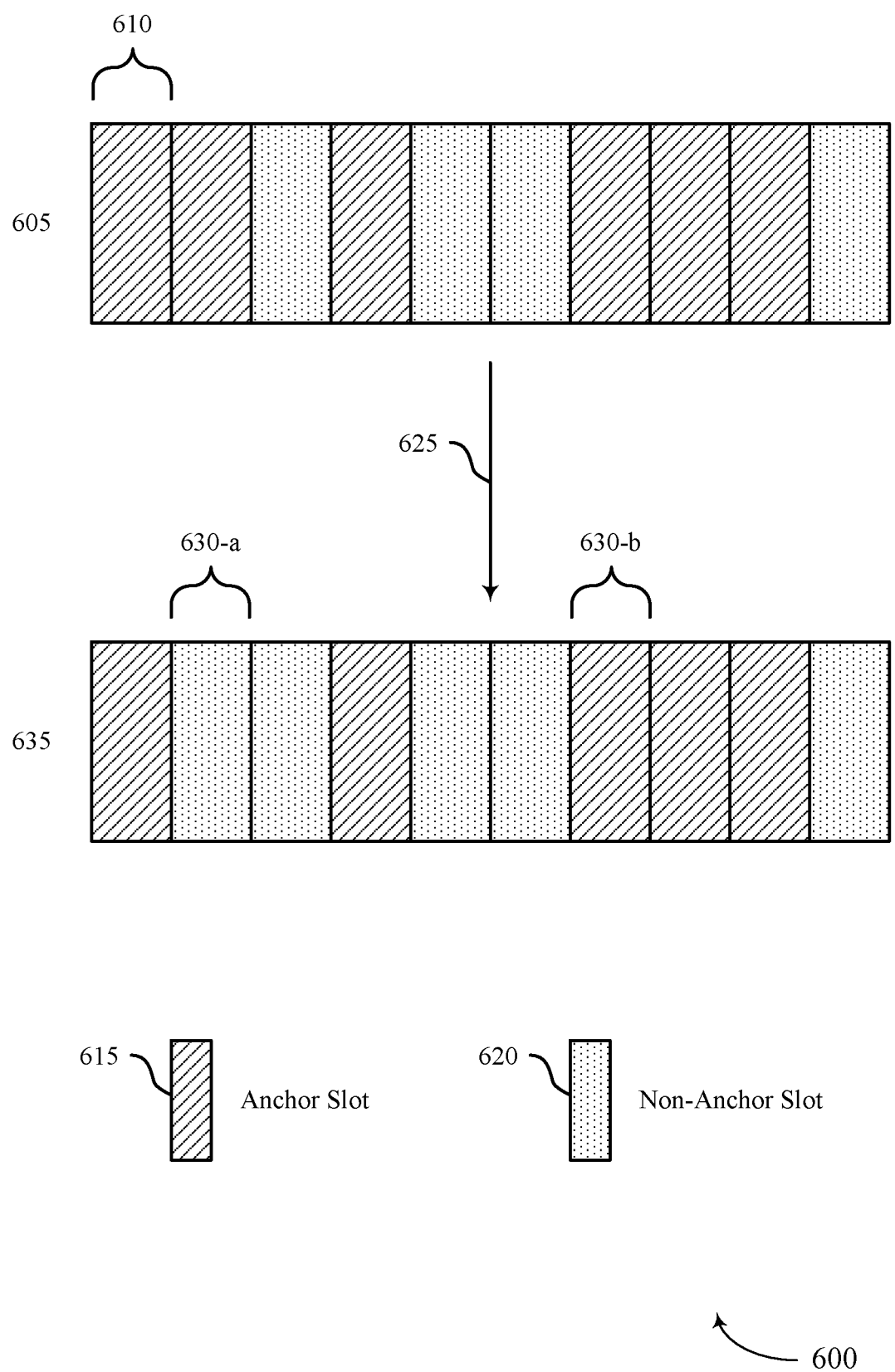
FIG. 6 illustrates an example of an anchor configuration that supports resolving slot format conflicts for wireless systems in accordance with aspects of the present disclosure.

FIG. 6 illustrates an example of an anchor configuration 600 that supports resolving slot format conflicts for wireless systems in accordance with various aspects of the present disclosure. In some examples, anchor configuration 600 may implement aspects of wireless communication systems 100 or 200 as described with reference to FIGS. 1 and 2. A network node (e.g., a base station 105 or an entity of the core network 130) may transmit an anchor configuration 605 to one or more UEs 115 or one or more base stations 105. Anchor configuration 605 may include a plurality of slots 610, which the network node may indicate as either anchor slots 615 or non-anchor slots 620.

In some cases, anchor slots 615 may indicate slots defined by a semi-static configuration that are not to be overridden or replaced by corresponding resources of one or more dynamic configurations. Non-anchor slots 610 may indicate slots that may initially be defined by a semi-static configuration, but may have different portions of the semi-static configuration overridden by one or more dynamic slot configurations (e.g., the flexible resources of the semi-static slot configuration have been replaced with corresponding resources from the dynamic slot configuration and the unknown/reserved resources of the dynamic slot configuration may override corresponding resources of the semi-static slot configuration (as shown with respect to FIG. 4) or the dynamic slot configuration may override all of the semi-static slot configuration (as shown with respect to FIG. 5)).

In some cases, a network node may transmit subsequent signaling 625 which may indicate a subset of anchor slots 615 as soft anchor slots 630 for an anchor configuration 635. The soft anchor slot signaling 625 may be transmitted via DCI or MAC-CE. The soft anchor slot signaling 625 may further indicate that the soft anchor slots 630-*a* and 630-*b* may be allowed to be overridden by dynamic configurations, similar to non-anchor slots 620. The soft anchor slots 630 may be converted through a semi-persistent activation message or a timer. As shown, soft anchor slot 630-*a* may be converted through an activation message or timer in the signaling 625 and become a non-anchor slot 620. Alternatively, the signaling 625 may indicate soft anchor slot 630-*b*, but in some cases, it may not be converted to a non-anchor slot 620 and remain an anchor slot 615. Soft anchor slots 630-*a* and 630-*b* may then be utilized in communications between a UE 115 and a base station according to the processes described above for anchor slots 615 and non-anchor slots 620, depending on if they have been converted or not.

Although the examples described herein illustrate specific scenarios, it is to be understood that the network node may transmit different anchor configurations 605 and soft anchor signaling 625 than those described.

Figure 7:
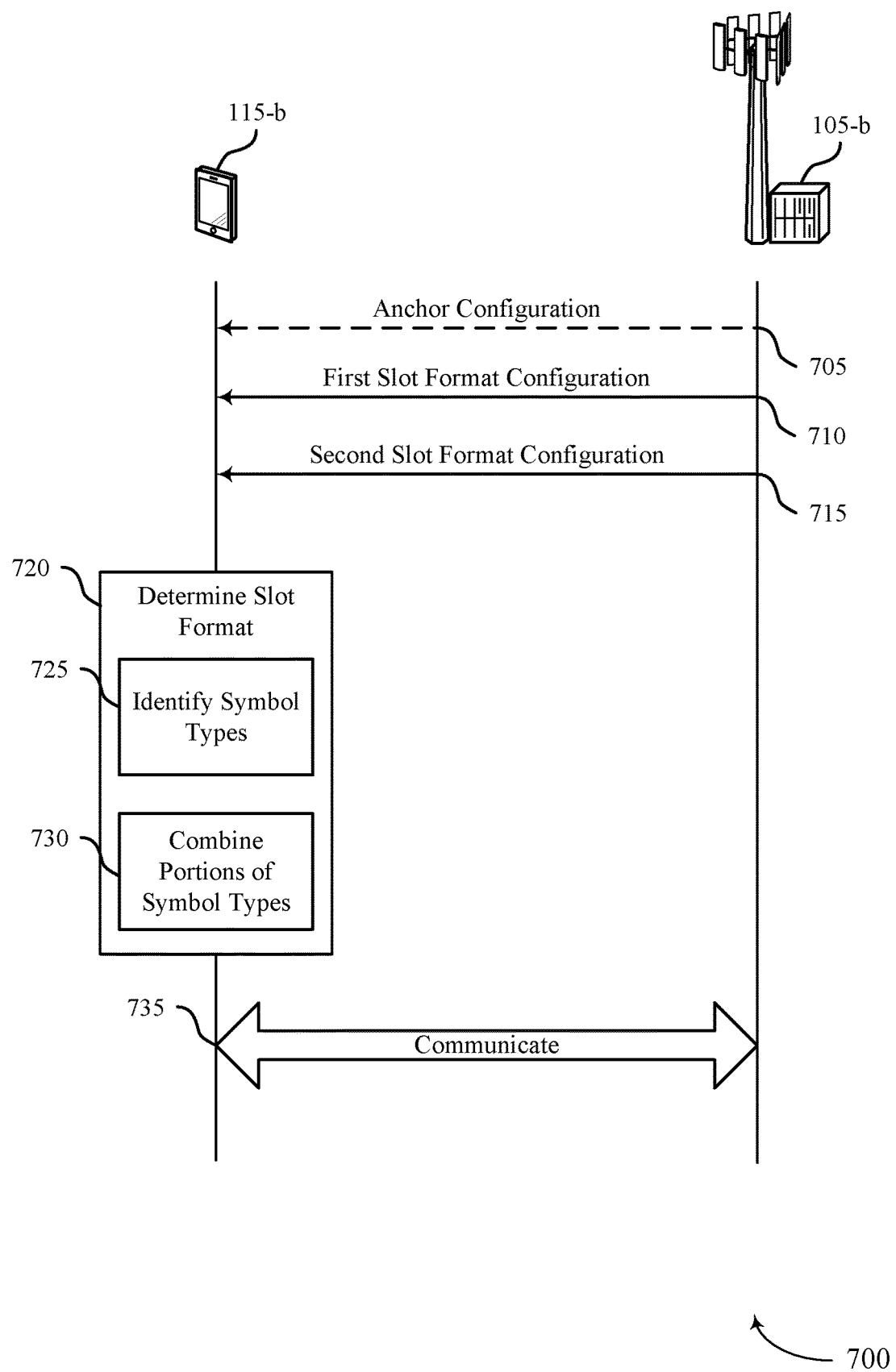
FIG. 7 illustrates an example of a process flow that supports resolving slot format conflicts for wireless systems in accordance with aspects of the present disclosure.

FIG. 7 illustrates an example of a process flow 700 that supports resolving slot format conflicts for wireless systems in accordance with various aspects of the present disclosure. In some examples, process flow 700 may implement aspects of wireless communication systems 100 or 200 as described with reference to FIGS. 1 and 2. Process flow 700 illustrates aspects of techniques performed by a base station 105-*b* and a UE 115-*b*, which may be examples of a base station 105 and a UE 115 as described with reference to FIGS. 1 through 6.

In the following description of the process flow 700, the operations between the UE 115-*b* and base station 105-*b* may be performed in different orders or at different times. Certain operations may also be left out of the process flow 700, or other operations may be added to the process flow 700.

At 705, UE 115-*b* may receive, from a network node (e.g., base station 105-*b* or entity of the core network 130), an anchor configuration for a set of slots including the first slot. In some cases, the anchor configuration may indicate a set of anchor slots, a set of soft anchor slots, and a set of non-anchor slots for the set of slots.

At 710, base station 105-*b* may transmit a first slot format configuration for a first slot for communication with UE 115-*b*. The first slot format configuration may be a semi-static slot configuration. The semi-static slot configuration may indicate a set of downlink symbols, a set of uplink symbols, a set of reserved symbols, and a set of flexible symbols for the first slot. The semi-static slot configuration may be transmitted via a RRC message or a broadcast message. The semi-static slot configuration may indicate one or more sets of symbol types for the set of symbols, each of the one or more sets of symbol types corresponding to a different frequency range. In some case, each frequency range may include a BWP of a frequency band. Alternatively, each frequency range may include a CC of a frequency band.

At 715, base station 105-*b* may transmit a second slot format configuration for the first slot to UE 115-*b*. The second slot format configuration may be a dynamic slot configuration. The dynamic slot configuration may indicate a set of downlink symbols, a set of uplink symbols, a set of reserved symbols, and a set of blank symbols for the first slot. The dynamic slot configuration may be transmitted via a common PDCCH. The common PDCCH may correspond to a group of UEs 115, including UE 115-*b*.

At 720, UE 115-*b* may determine a slot format for the first slot based at least in part on the first and second slot format configurations or the anchor configuration. Determining the slot format may include identifying a symbol type for each of the set of symbols based at least in part on the semi-static slot configuration and the dynamic slot configurations at 725. For example, UE 115-*b* may replace flexible symbols indicated by the semi-static slot configuration with symbol types for respective symbols indicated by the dynamic slot configuration and maintain symbols other than the replaced symbols with slot types indicated by the semi-static slot configuration. In other examples, UE 115-*b* may replace symbols indicated by the semi-static slot configuration with corresponding reserved symbol types indicated by the dynamic slot configuration and maintain symbols other than the replaced symbols with the slot types indicated by the semi-static slot configuration. In other examples, UE 115-*b* may replace symbols indicated by the semi-static slot configuration with symbol types for respective symbols indicated by the dynamic slot configuration.

At 730, UE 115-*b* may combine a first portion of symbol types indicated by the first slot format configuration with a second portion of symbol types indicated by the second slot formation configuration to obtain the determined slot format, wherein the first slot format configuration is a semi-static slot configuration and wherein the second slot format configuration is a dynamic slot configuration. In some cases, the second portion of symbol types may be limited to symbols that correspond to flexible symbols indicated by the semi-static slot configuration. Alternatively, the second portion of symbol types comprises all symbols indicated by the semi-static slot configuration.

At 735, UE 115-*b* and base station 105-*b* may communicate over a set of symbols of a first slot according to the determined slot format.

Figure 8:
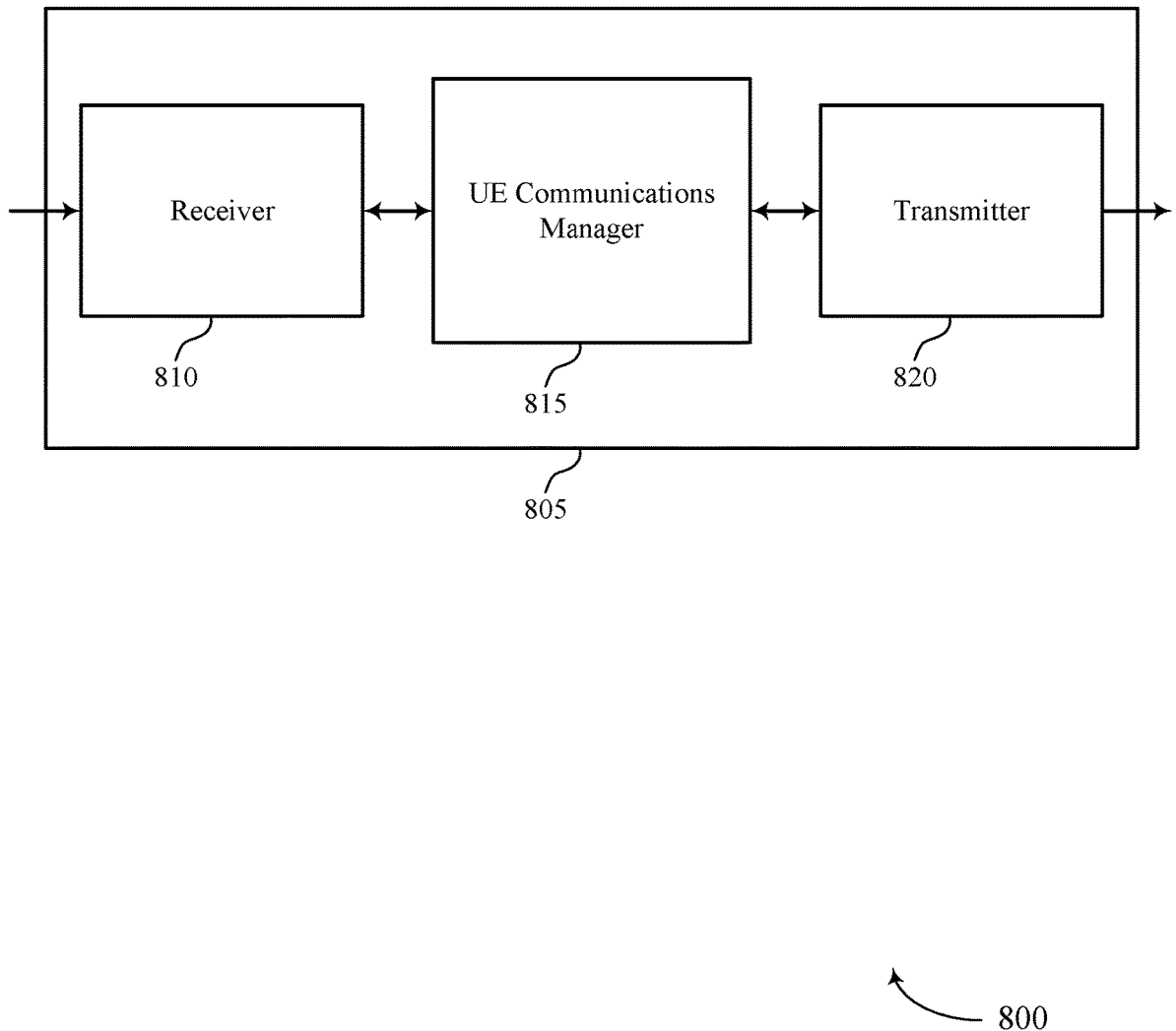
FIGS. 8 through 10 show block diagrams of a device that supports resolving slot format conflicts for wireless systems in accordance with aspects of the present disclosure.

FIG. 8 shows a block diagram 800 of a wireless device 805 that supports resolving slot format conflicts for wireless systems in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resolving slot format conflicts for wireless systems, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may identify a first slot format configuration for a first slot for communication with a base station. UE communications manager 815 may receive, from the base station, an indication of a second slot format configuration for the first slot. UE communications manager 815 may determine a slot format for the first slot based on the first and second slot format configurations and communicate with the base station over a set of symbols of the first slot according to the determined slot format.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
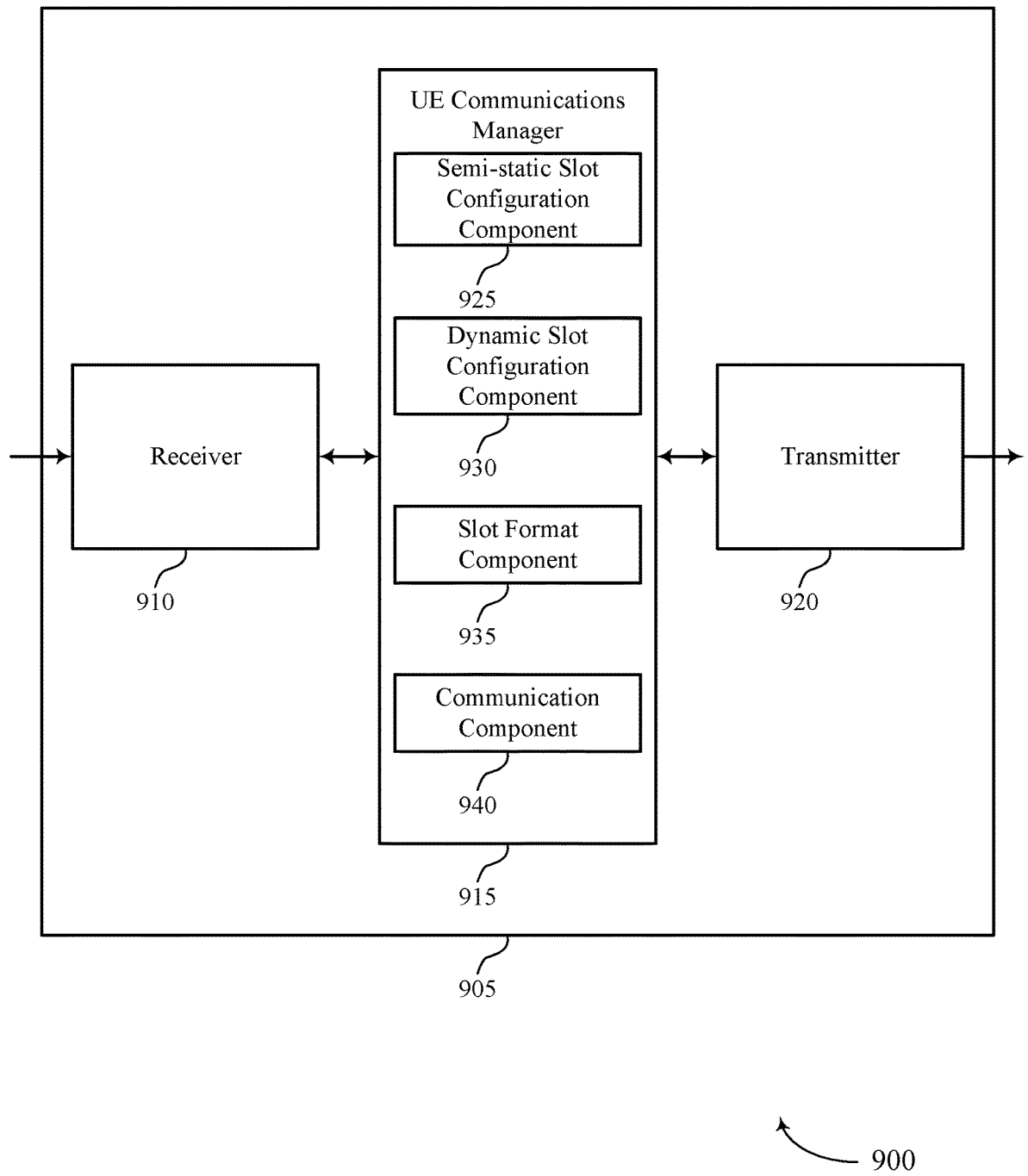

FIG. 9 shows a block diagram 900 of a wireless device 905 that supports resolving slot format conflicts for wireless systems in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to resolving slot format conflicts for wireless systems, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include semi-static slot configuration component 925, dynamic slot configuration component 930, slot format component 935, and communication component 940.

Semi-static slot configuration component 925 may identify a first slot format configuration for a first slot for communication with a base station. In some cases, the first slot format configuration is a semi-static slot configuration. In some cases, identifying the first slot format configuration includes: receiving, from the base station, a semi-static slot configuration indicating a set of downlink symbols, a set of uplink symbols, a set of reserved symbols, and a set of flexible symbols for the first slot. In some cases, the semi-static slot configuration is received via an RRC message or a broadcast message. In some cases, the semi-static slot configuration indicates one or more sets of symbol types for the set of symbols, each of the one or more sets of symbol types corresponding to a different frequency range. In some cases, each frequency range includes a BWP of a frequency band. In some cases, each frequency range includes a CC of a frequency band.

Dynamic slot configuration component 930 may receive, from the base station, a second slot format configuration, or an indication thereof, for the first slot. In some cases, the second slot format configuration is a dynamic slot configuration. In some cases, receiving the second slot format configuration includes: receiving, from the base station, a dynamic slot configuration indicating a set of downlink symbols, a set of uplink symbols, a set of reserved symbols, and a set of blank symbols for the first slot. In some cases, the dynamic slot configuration is received via a common PDCCH. In some cases, the common PDCCH corresponds to a group of UEs.

Slot format component 935 may determine a slot format for the first slot based on the first and second slot format configurations. In some cases, determining the slot format includes: identifying a symbol type for each of the set of symbols based on the semi-static slot configuration and the dynamic slot configuration. In some cases, determining the slot format includes: combining a first portion of symbol types indicated by the first slot format configuration with a second portion of symbol types indicated by the second slot format configuration to obtain the determined slot format, where the first slot format configuration is a semi-static slot configuration and where the second slot format configuration is a dynamic slot configuration. In some cases, the second portion of symbol types is limited to symbols that correspond to flexible symbols indicated by the semi-static slot configuration. In some cases, the second portion of symbol types is limited to reserved symbols indicated by the dynamic slot configuration. In some cases, the second portion of symbol types includes all symbols indicated by the semi-static slot configuration.

Communication component 940 may communicate with the base station over a set of symbols of the first slot according to the determined slot format.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
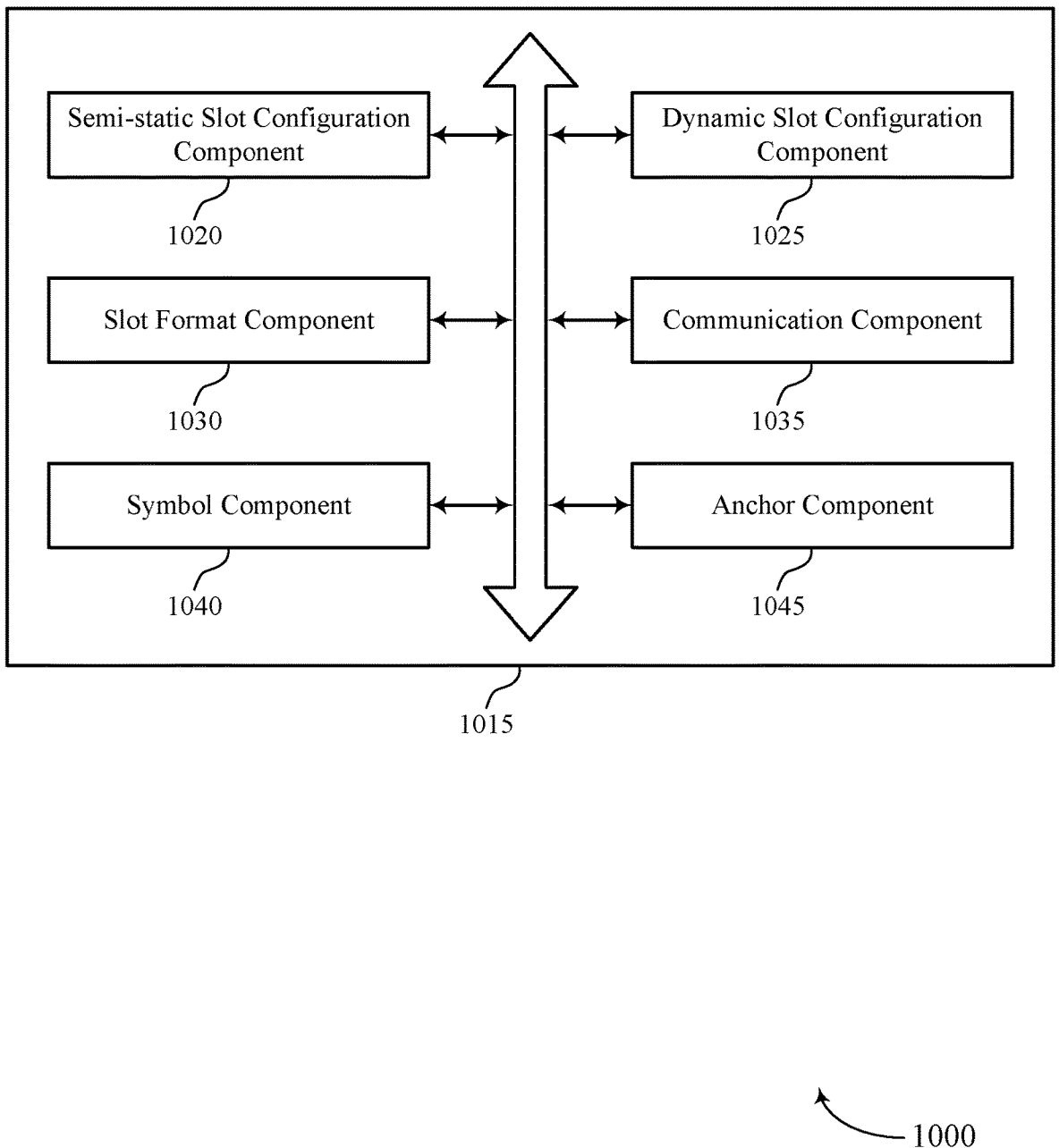

FIG. 10 shows a block diagram 1000 of a UE communications manager 1015 that supports resolving slot format conflicts for wireless systems in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include semi-static slot configuration component 1020, dynamic slot configuration component 1025, slot format component 1030, communication component 1035, symbol component 1040, and anchor component 1045. Each of these modules may communicate, directly or indirectly, with one another (e.g., via one or more buses).

Semi-static slot configuration component 1020 may identify a first slot format configuration for a first slot for communication with a base station. In some cases, the first slot format configuration is a semi-static slot configuration. In some cases, identifying the first slot format configuration includes: receiving, from the base station, a semi-static slot configuration indicating a set of downlink symbols, a set of uplink symbols, a set of reserved symbols, and a set of flexible symbols for the first slot. In some cases, the semi-static slot configuration is received via a RRC message or a broadcast message. In some cases, the semi-static slot configuration indicates one or more sets of symbol types for the set of symbols, each of the one or more sets of symbol types corresponding to a different frequency range. In some cases, each frequency range includes a BWP of a frequency band. In some cases, each frequency range includes a CC of a frequency band.

Dynamic slot configuration component 1025 may receive, from the base station, a second slot format configuration for the first slot. In some cases, receiving the second slot format configuration may include receiving an indication of the second slot format configuration. In some cases, the second slot format configuration is a dynamic slot configuration. In some cases, receiving the indication of the second slot format configuration includes: receiving, from the base station, a dynamic slot configuration indicating a set of downlink symbols, a set of uplink symbols, a set of reserved symbols, and a set of blank symbols for the first slot. In some cases, the dynamic slot configuration is received via a common PDCCH. In some cases, the common PDCCH corresponds to a group of UEs.

Slot format component 1030 may determine a slot format for the first slot based on the first and second slot format configurations. In some cases, determining the slot format includes: identifying a symbol type for each of the set of symbols based on the semi-static slot configuration and the dynamic slot configuration. In some cases, determining the slot format includes: combining a first portion of symbol types indicated by the first slot format configuration with a second portion of symbol types indicated by the second slot format configuration to obtain the determined slot format, where the first slot format configuration is a semi-static slot configuration and where the second slot format configuration is a dynamic slot configuration. In some cases, the second portion of symbol types is limited to symbols that correspond to flexible symbols indicated by the semi-static slot configuration. In some cases, the second portion of symbol types is limited to reserved symbols indicated by the dynamic slot configuration. In some cases, the second portion of symbol types includes all symbols indicated by the semi-static slot configuration.

Communication component 1035 may communicate with the base station over a set of symbols of the first slot according to the determined slot format.

Symbol component 1040 may replace symbols indicated by the semi-static slot configuration with corresponding reserved symbol types indicated by the dynamic slot configuration. In some cases, identifying the symbol type for each of the set of symbols includes: replacing flexible symbols indicated by the semi-static slot configuration with symbol types for respective symbols indicated by the dynamic slot configuration and maintaining symbols other than the replaced flexible symbols with slot types indicated by the semi-static slot configuration. In some cases, identifying the symbol type for each of the set of symbols includes: replacing all symbols indicated by the semi-static slot configuration with symbol types for respective symbols indicated by the dynamic slot configuration.

Anchor component 1045 may receive, from a network node, an anchor configuration for a set of slots including the first slot, the anchor configuration indicating a set of anchor slots, a set of soft anchor slots, and a set of non-anchor slots for the set of slots, where the determined slot format for the first slot is determined based on the anchor configuration and receive an indication that the first slot is to be converted from an anchor slot to a non-anchor slot, where, as a non-anchor slot, symbol types of the first slot are determined based on at least in part on the second slot format configuration. In some cases, the first slot corresponds to an anchor slot. In some cases, determining the slot format for the first slot includes: determining symbol types for symbols of the first slot based on only the first slot format configuration. In some cases, the indication is received via DCI or a MAC-CE. In some cases, the indication is enabled based on a semi-persistent activation message or a timer. In some cases, the first slot corresponds to a non-anchor slot. In some cases, determining the slot format for the first slot includes: determining symbol types for symbols of the first slot based on the second slot format configuration.

Figure 11:
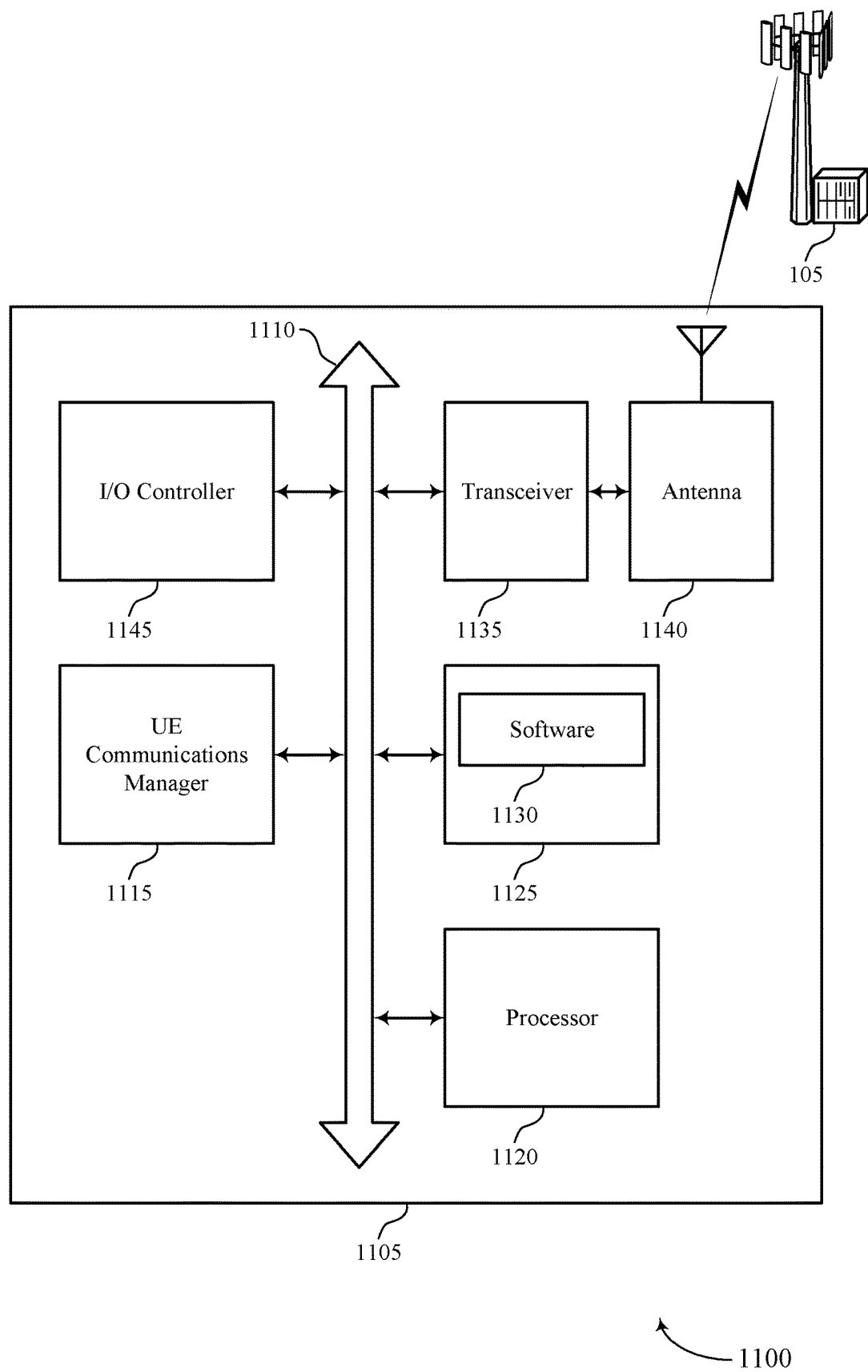
FIG. 11 illustrates a block diagram of a system including a user equipment (UE) that supports resolving slot format conflicts for wireless systems in accordance with aspects of the present disclosure.

FIG. 11 shows a diagram of a system 1100 including a device 1105 that supports resolving slot format conflicts for wireless systems in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting resolving slot format conflicts for wireless systems).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support resolving slot format conflicts for wireless systems. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
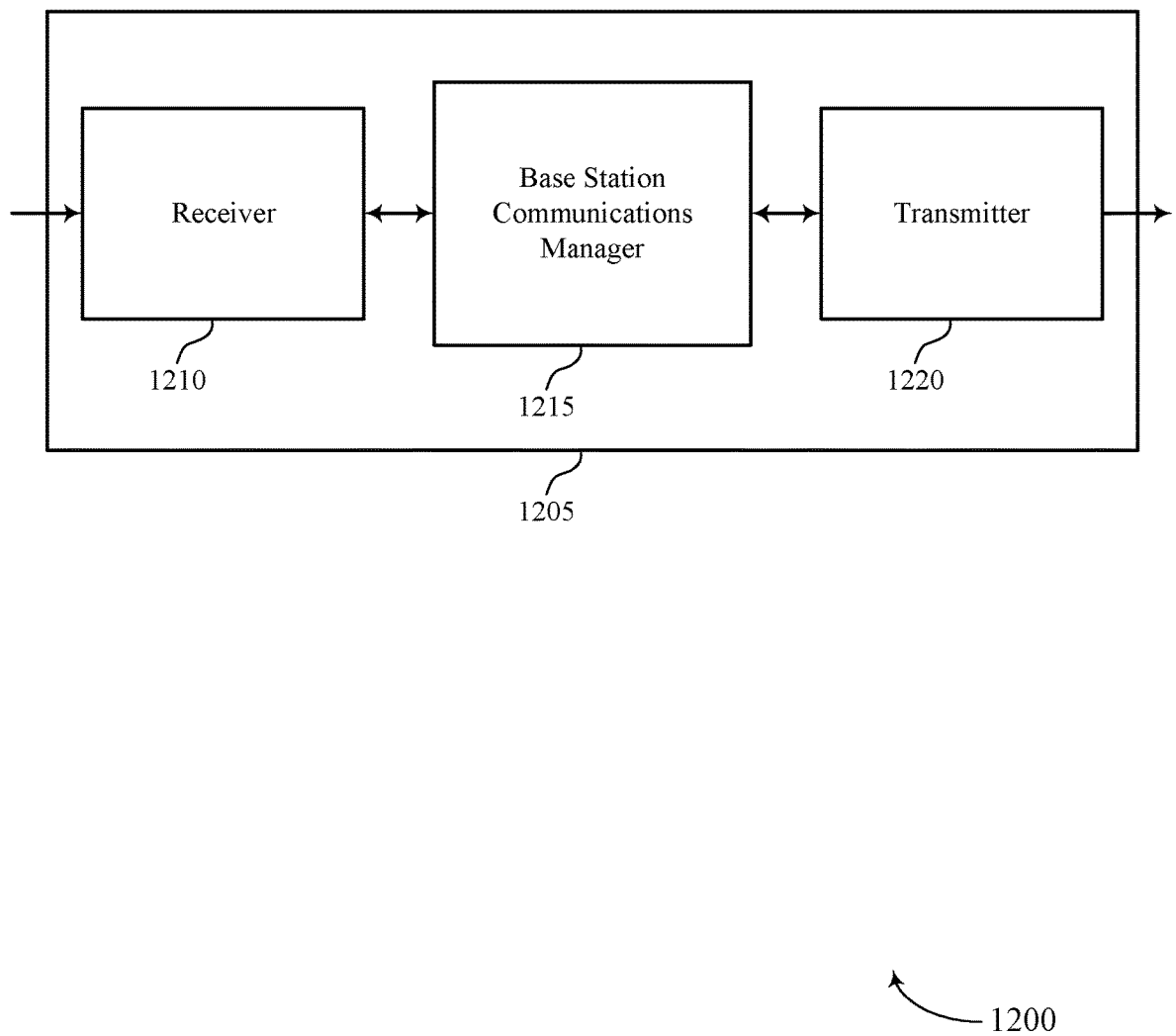
FIGS. 12 through 14 show block diagrams of a device that supports resolving slot format conflicts for wireless systems in accordance with aspects of the present disclosure.

FIG. 12 shows a block diagram 1200 of a wireless device 1205 that supports resolving slot format conflicts for wireless systems in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resolving slot format conflicts for wireless systems, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may transmit a first slot format configuration for a first slot for communication with a UE, transmit, to the UE, an indication of a second slot format configuration for the first slot, and communicate with the UE over a set of symbols of the first slot according a slot format based on the first slot format configuration and the second slot format configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
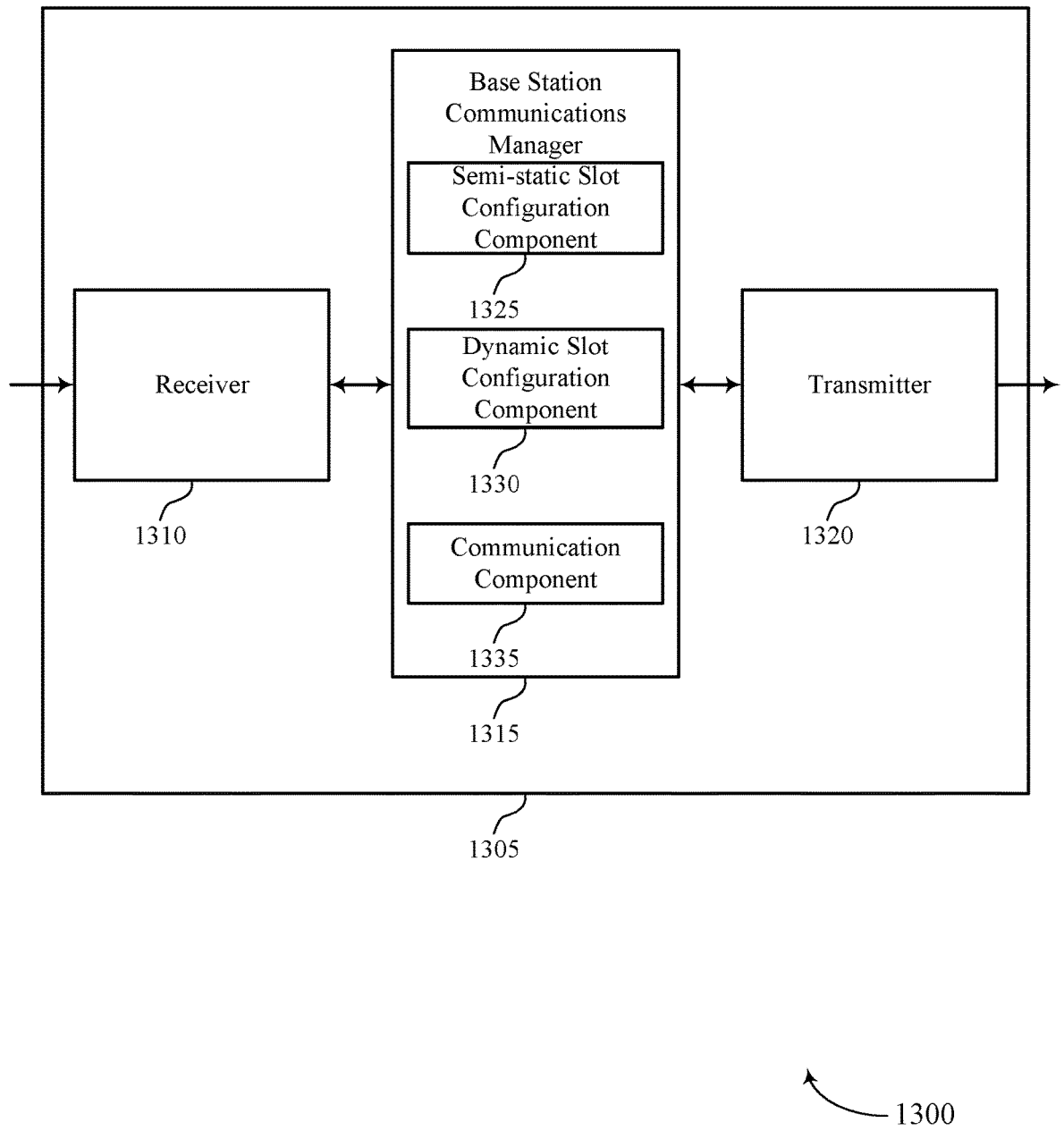

FIG. 13 shows a block diagram 1300 of a wireless device 1305 that supports resolving slot format conflicts for wireless systems in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to resolving slot format conflicts for wireless systems, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include semi-static slot configuration component 1325, dynamic slot configuration component 1330, and communication component 1335.

Semi-static slot configuration component 1325 may transmit, by a base station, a first slot format configuration for a first slot for communication with a UE. In some cases, the first slot format configuration is a semi-static slot configuration. In some cases, transmitting the first slot format configuration includes: transmitting a semi-static slot configuration indicating a set of downlink symbols, a set of uplink symbols, a set of reserved symbols, and a set of flexible symbols for the first slot. In some cases, the semi-static slot configuration is transmitted via a RRC message or a broadcast message. In some cases, the semi-static slot configuration indicates one or more sets of symbol types for the set of symbols, each of the one or more sets of symbol types corresponding to a different frequency range. In some cases, each frequency range includes a BWP of a frequency band. In some cases, each frequency range includes a CC of a frequency band.

Dynamic slot configuration component 1330 may transmit, to the UE, an indication of a second slot format configuration for the first slot. In some cases, the second slot format configuration is a dynamic slot configuration. In some cases, transmitting the indication of the second slot format configuration includes: transmitting a dynamic slot configuration indicating a set of downlink symbols, a set of uplink symbols, a set of reserved symbols, and a set of blank symbols for the first slot. In some cases, the dynamic slot configuration is transmitted via a common PDCCH. In some cases, the common PDCCH corresponds to a group of UEs.

Communication component 1335 may communicate with the UE over a set of symbols of the first slot according a slot format based on the first slot format configuration and the second slot format configuration.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
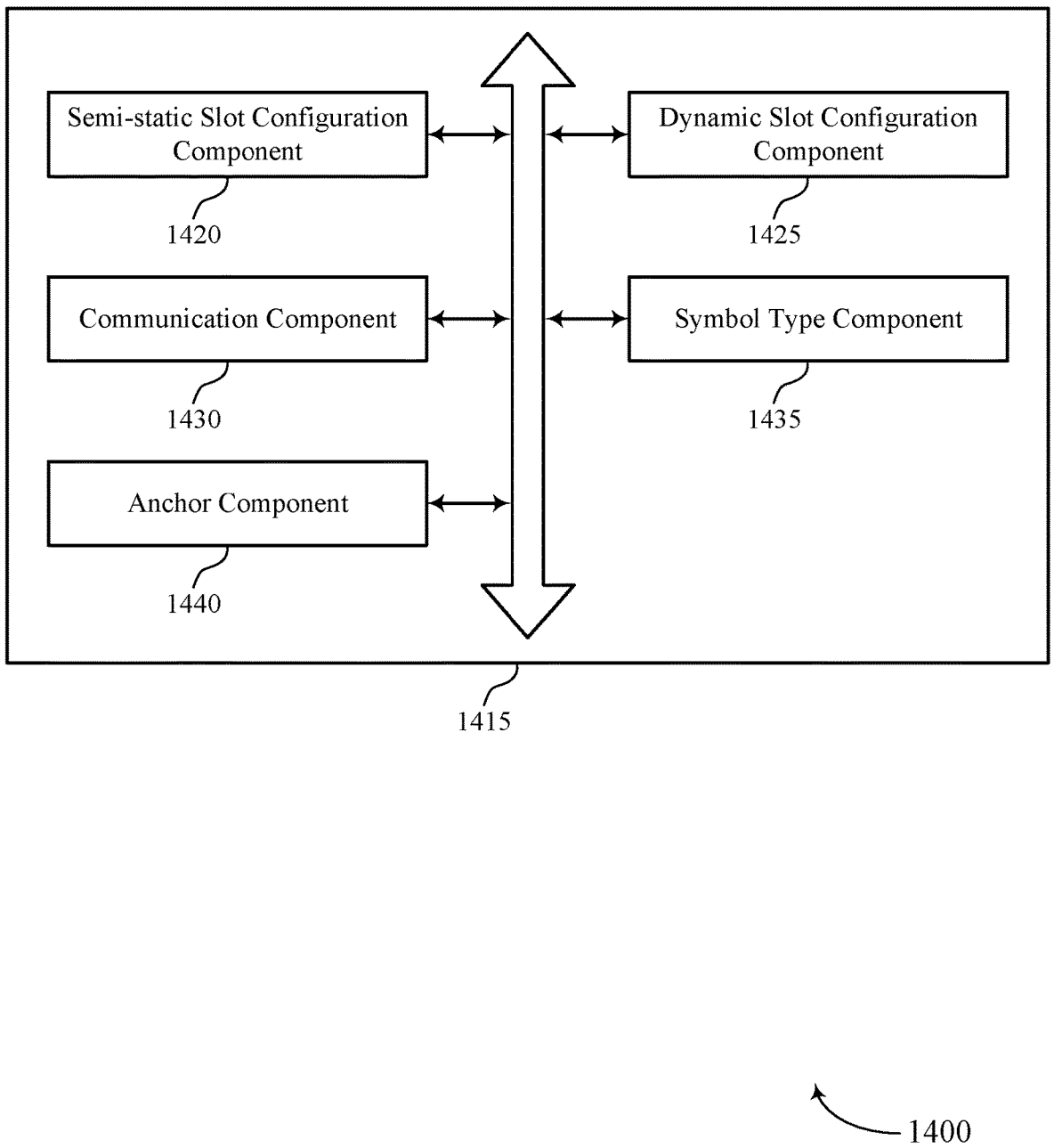

FIG. 14 shows a block diagram 1400 of a base station communications manager 1415 that supports resolving slot format conflicts for wireless systems in accordance with aspects of the present disclosure. The base station communications manager 1415 may be an example of aspects of a base station communications manager 1515 described with reference to FIGS. 12, 13, and 15. The base station communications manager 1415 may include semi-static slot configuration component 1420, dynamic slot configuration component 1425, communication component 1430, symbol type component 1435, and anchor component 1440. Each of these modules may communicate, directly or indirectly, with one another (e.g., via one or more buses).

Semi-static slot configuration component 1420 may transmit, by a base station, a first slot format configuration for a first slot for communication with a UE. In some cases, the first slot format configuration is a semi-static slot configuration. In some cases, transmitting the first slot format configuration includes: transmitting a semi-static slot configuration indicating a set of downlink symbols, a set of uplink symbols, a set of reserved symbols, and a set of flexible symbols for the first slot. In some cases, the semi-static slot configuration is transmitted via a RRC message or a broadcast message. In some cases, the semi-static slot configuration indicates one or more sets of symbol types for the set of symbols, each of the one or more sets of symbol types corresponding to a different frequency range. In some cases, each frequency range includes a BWP of a frequency band. In some cases, each frequency range includes a CC of a frequency band.

Dynamic slot configuration component 1425 may transmit, to the UE, an indication of a second slot format configuration for the first slot. In some cases, the second slot format configuration is a dynamic slot configuration. In some cases, transmitting the indication of the second slot format configuration includes: transmitting dynamic slot configuration indicating a set of downlink symbols, a set of uplink symbols, a set of reserved symbols, and a set of blank symbols for the first slot. In some cases, the dynamic slot configuration is transmitted via a common PDCCH. In some cases, the common PDCCH corresponds to a group of UEs.

Communication component 1430 may communicate with the UE over a set of symbols of the first slot according a slot format based on the first slot format configuration and the second slot format configuration.

Symbol type component 1435 may identify a symbol type for each of the set of symbols based on the semi-static and dynamic slot configurations.

Anchor component 1440 may receive, from a network node, an anchor configuration for a set of slots including the first slot, the anchor configuration indicating a set of anchor slots, a set of soft anchor slots, and a set of non-anchor slots for the set of slots, where the slot format for the first slot is based on the anchor configuration and indicate one or more soft anchor slots via DCI or a MAC-CE. In some cases, the first slot corresponds to an anchor slot. In some cases, the slot format for the first slot is based on only symbol types for the set of symbols as indicated by the first slot format configuration. In some cases, the first slot corresponds to a soft anchor slot. In some cases, the slot format for the first slot is based on only symbol types for the set of symbols as indicated by the second slot format configuration. In some cases, the first slot corresponds to a non-anchor slot. In some cases, the slot format for the first slot is based on only flexible or reserved symbol types for a subset of symbols as indicated by the first slot format configuration that are replaced with respective symbol types as indicated by the second slot format configuration.

Figure 15:
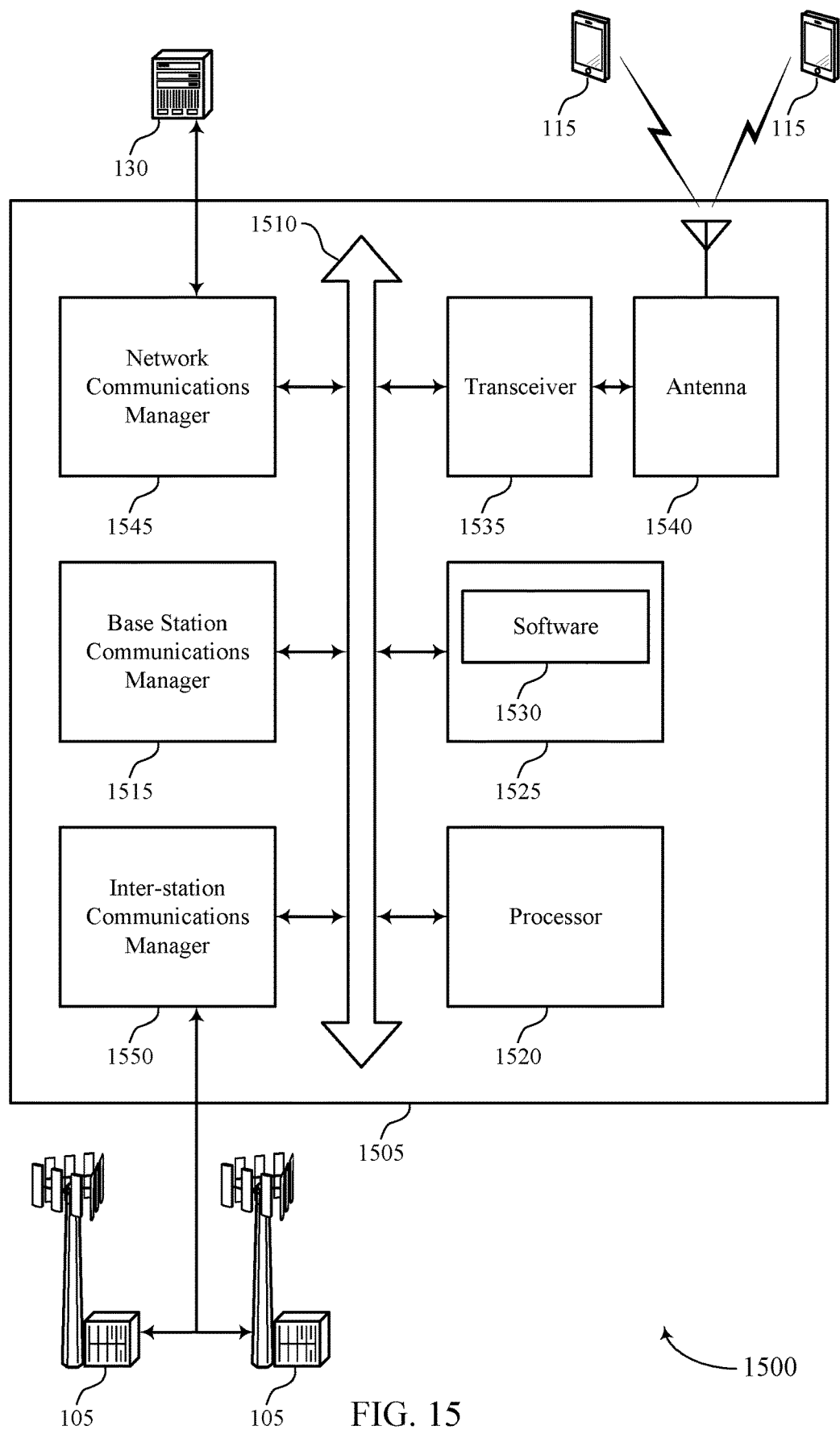
FIG. 15 illustrates a block diagram of a system including a base station that supports resolving slot format conflicts for wireless systems in accordance with aspects of the present disclosure.

FIG. 15 shows a diagram of a system 1500 including a device 1505 that supports resolving slot format conflicts for wireless systems in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting resolving slot format conflicts for wireless systems).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support resolving slot format conflicts for wireless systems. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
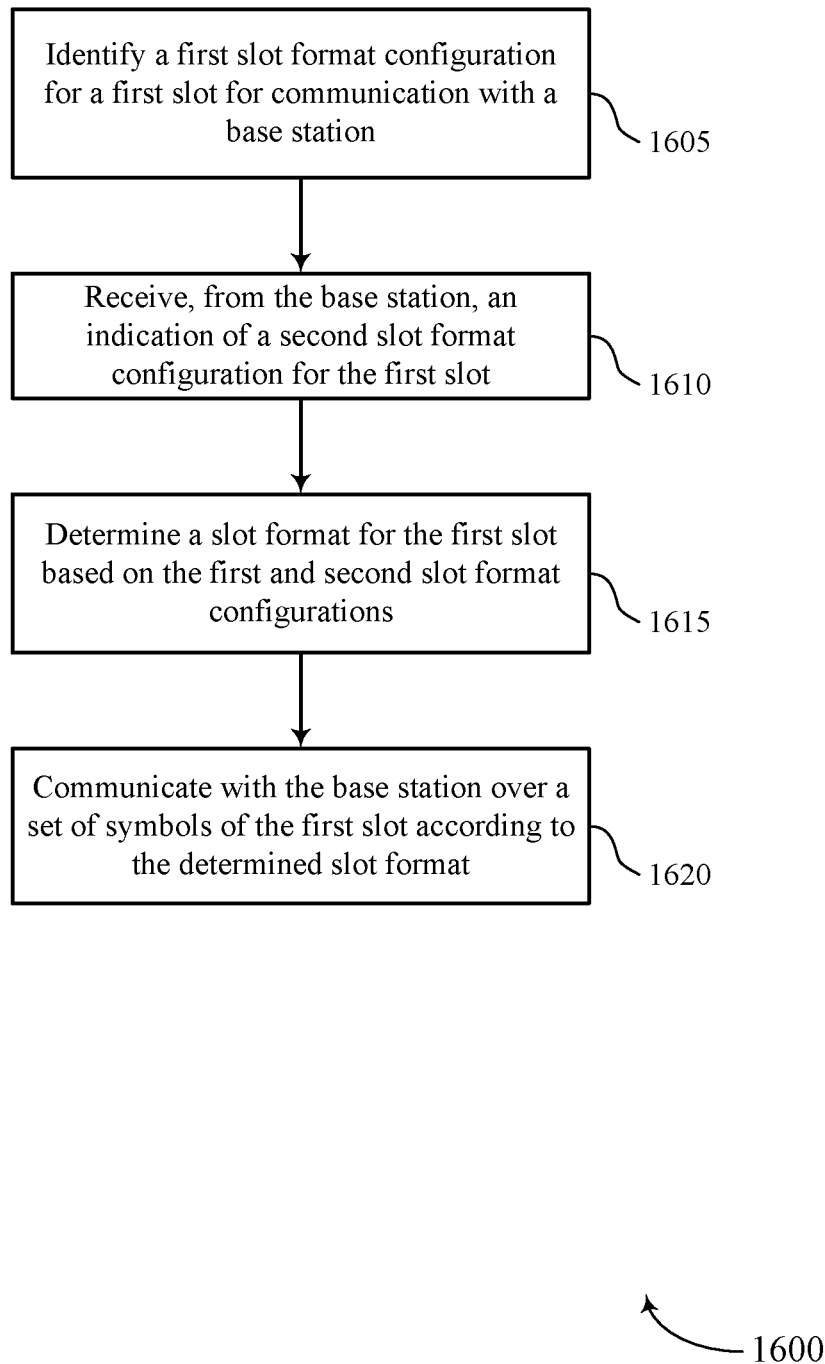
FIGS. 16 through 19 illustrate methods for resolving slot format conflicts for wireless systems in accordance with aspects of the present disclosure.

FIG. 16 shows a flowchart illustrating a method 1600 for resolving slot format conflicts for wireless systems in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a first slot format configuration for a first slot for communication with a base station. The operations of block 1605 may be performed according to the methods described herein. In certain examples, aspects of the operations of block 1605 may be performed by a semi-static slot configuration component as described with reference to FIGS. 8 through 11.

At block 1610 the UE 115 may receive, from the base station, an indication of a second slot format configuration for the first slot. The operations of block 1610 may be performed according to the methods described herein. In certain examples, aspects of the operations of block 1610 may be performed by a dynamic slot configuration component as described with reference to FIGS. 8 through 11.

At block 1615 the UE 115 may determine a slot format for the first slot based at least in part on the first and second slot format configurations. The operations of block 1615 may be performed according to the methods described herein. In certain examples, aspects of the operations of block 1615 may be performed by a slot format component as described with reference to FIGS. 8 through 11.

At block 1620 the UE 115 may communicate with the base station over a set of symbols of the first slot according to the determined slot format. The operations of block 1620 may be performed according to the methods described herein. In certain examples, aspects of the operations of block 1620 may be performed by a communication component as described with reference to FIGS. 8 through 11.

Figure 17:
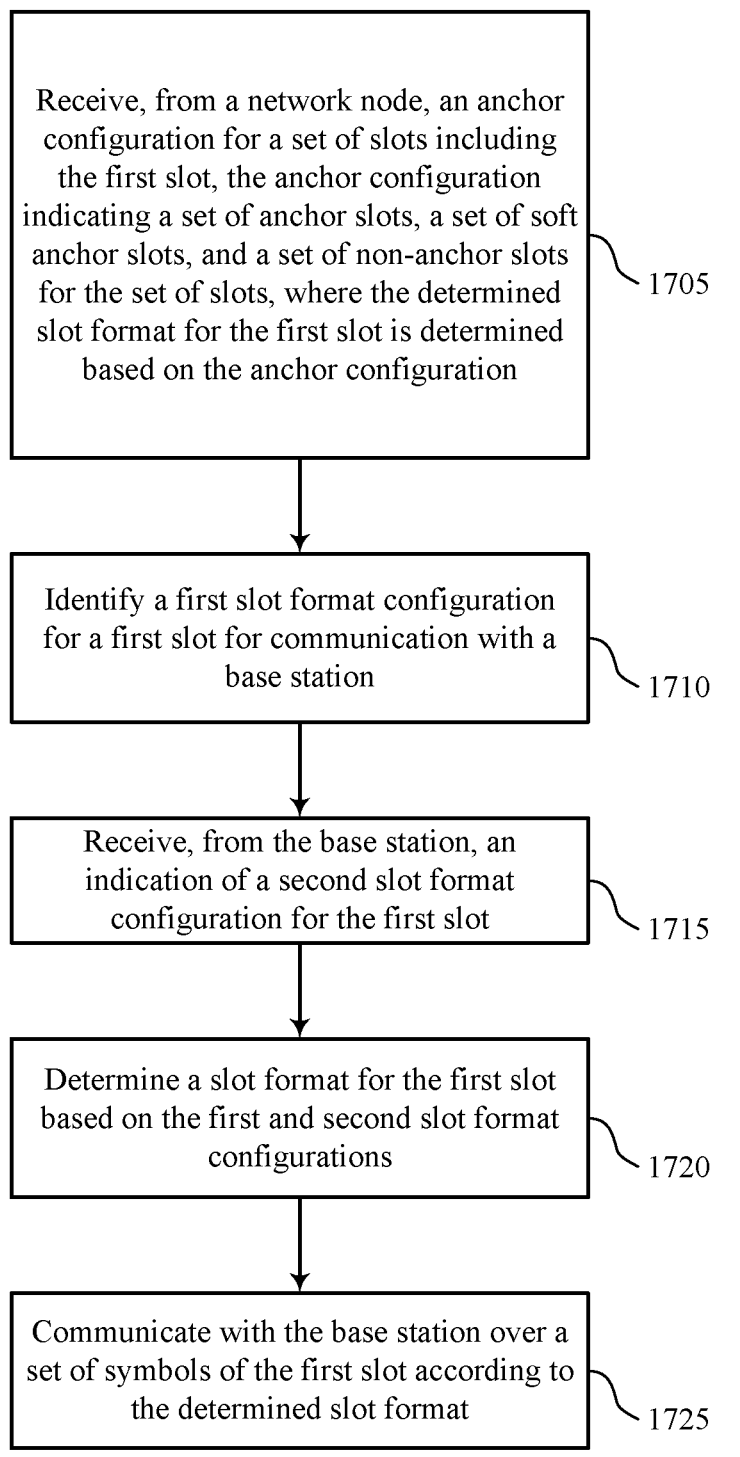

FIG. 17 shows a flowchart illustrating a method 1700 for resolving slot format conflicts for wireless systems in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, from a network node, an anchor configuration for a set of slots including the first slot, the anchor configuration indicating a set of anchor slots, a set of soft anchor slots, and a set of non-anchor slots for the set of slots, wherein the determined slot format for the first slot is determined based at least in part on the anchor configuration. The operations of block 1705 may be performed according to the methods described herein. In certain examples, aspects of the operations of block 1705 may be performed by an anchor component as described with reference to FIGS. 8 through 11.

At block 1710 the UE 115 may identify a first slot format configuration for a first slot for communication with a base station. The operations of block 1710 may be performed according to the methods described herein. In certain examples, aspects of the operations of block 1710 may be performed by a semi-static slot configuration component as described with reference to FIGS. 8 through 11.

At block 1715 the UE 115 may receive, from the base station, an indication of a second slot format configuration for the first slot. The operations of block 1715 may be performed according to the methods described herein. In certain examples, aspects of the operations of block 1715 may be performed by a dynamic slot configuration component as described with reference to FIGS. 8 through 11.

At block 1720 the UE 115 may determine a slot format for the first slot based at least in part on the first and second slot format configurations. The operations of block 1720 may be performed according to the methods described herein. In certain examples, aspects of the operations of block 1720 may be performed by a slot format component as described with reference to FIGS. 8 through 11.

At block 1725 the UE 115 may communicate with the base station over a set of symbols of the first slot according to the determined slot format. The operations of block 1725 may be performed according to the methods described herein. In certain examples, aspects of the operations of block 1725 may be performed by a communication component as described with reference to FIGS. 8 through 11.

Figure 18:
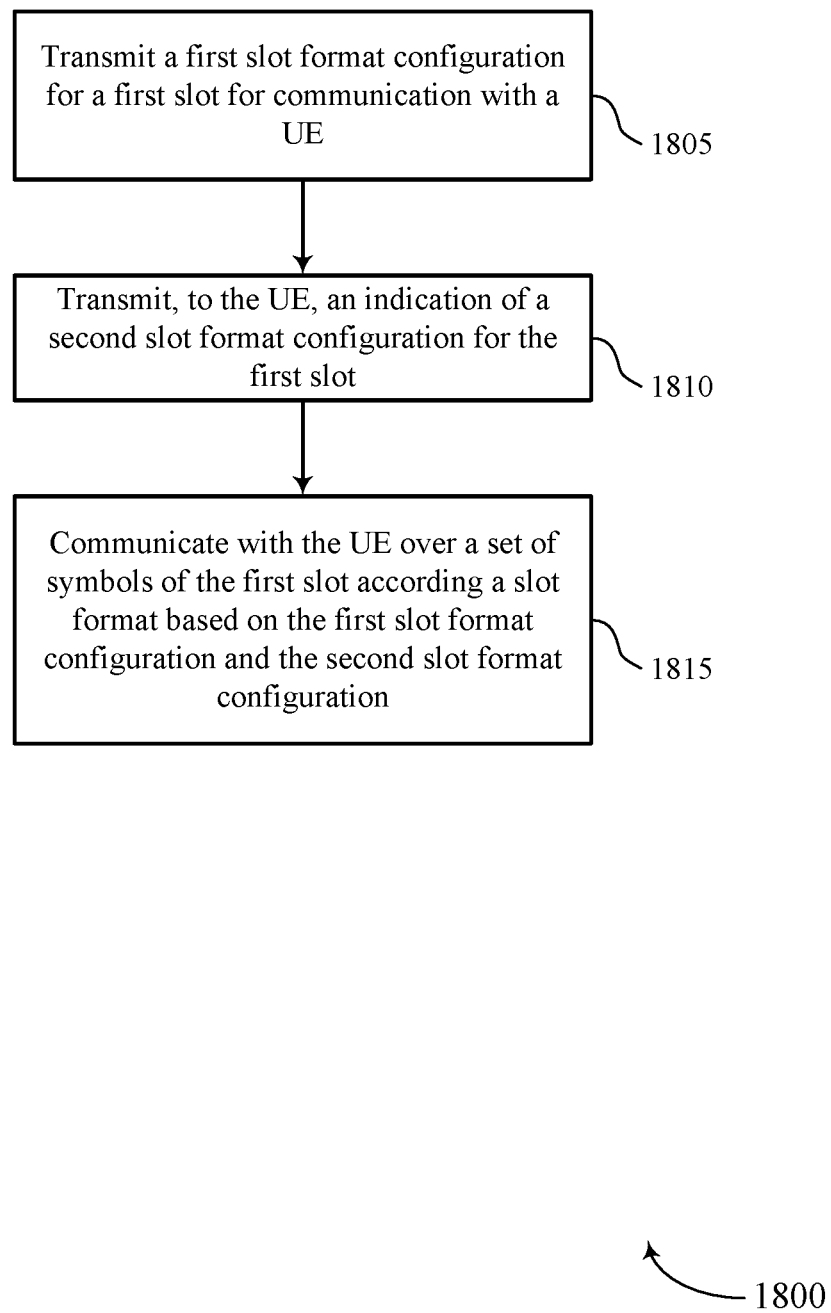

FIG. 18 shows a flowchart illustrating a method 1800 for resolving slot format conflicts for wireless systems in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a first slot format configuration for a first slot for communication with a UE. The operations of block 1805 may be performed according to the methods described herein. In certain examples, aspects of the operations of block 1805 may be performed by a semi-static slot configuration component as described with reference to FIGS. 12 through 15.

At block 1810 the base station 105 may transmit, to the UE, an indication of a second slot format configuration for the first slot. The operations of block 1810 may be performed according to the methods described herein. In certain examples, aspects of the operations of block 1810 may be performed by a dynamic slot configuration component as described with reference to FIGS. 12 through 15.

At block 1815 the base station 105 may communicate with the UE over a set of symbols of the first slot according a slot format based at least in part on the first slot format configuration and the second slot format configuration. The operations of block 1815 may be performed according to the methods described herein. In certain examples, aspects of the operations of block 1815 may be performed by a communication component as described with reference to FIGS. 12 through 15.

Figure 19:
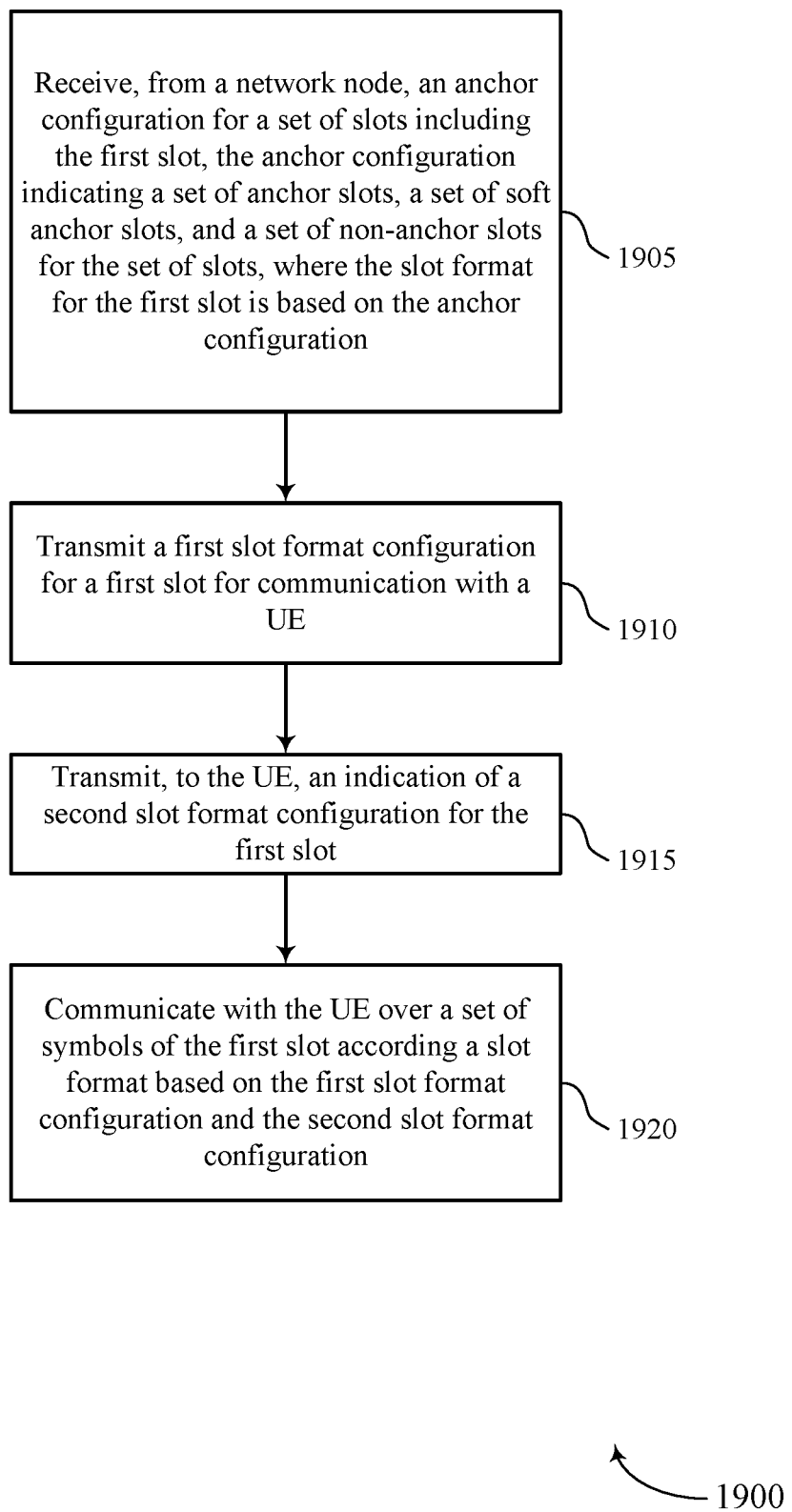

FIG. 19 shows a flowchart illustrating a method 1900 for resolving slot format conflicts for wireless systems in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive, from a network node, an anchor configuration for a set of slots including the first slot, the anchor configuration indicating a set of anchor slots, a set of soft anchor slots, and a set of non-anchor slots for the set of slots, wherein the slot format for the first slot is based at least in part on the anchor configuration. The operations of block 1905 may be performed according to the methods described herein. In certain examples, aspects of the operations of block 1905 may be performed by an anchor component as described with reference to FIGS. 12 through 15.

At block 1910 the base station 105 may transmit a first slot format configuration for a first slot for communication with a UE. The operations of block 1910 may be performed according to the methods described herein. In certain examples, aspects of the operations of block 1910 may be performed by a semi-static slot configuration component as described with reference to FIGS. 12 through 15.

At block 1915 the base station 105 may transmit, to the UE, an indication of a second slot format configuration for the first slot. The operations of block 1915 may be performed according to the methods described herein. In certain examples, aspects of the operations of block 1915 may be performed by a dynamic slot configuration component as described with reference to FIGS. 12 through 15.

At block 1920 the base station 105 may communicate with the UE over a set of symbols of the first slot according a slot format based at least in part on the first slot format configuration and the second slot format configuration. The operations of block 1920 may be performed according to the methods described herein. In certain examples, aspects of the operations of block 1920 may be performed by a communication component as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, by a user equipment (UE), a first slot format configuration for a first slot for communication with a base station;
    receiving, from the base station, an indication of a second slot format configuration for the first slot;
    determining a slot format for the first slot based at least in part on the first and second slot format configurations; and
    communicating with the base station over a set of symbols of the first slot according to the determined slot format.
2. The method of claim 1, wherein:
    the first slot format configuration is a semi-static slot configuration; and
    the second slot format configuration is a dynamic slot configuration.
3. The method of claim 2, wherein determining the slot format comprises:
    identifying a symbol type for each of the set of symbols based at least in part on the semi-static slot configuration and the dynamic slot configuration.
4. The method of claim 3, wherein identifying the symbol type for each of the set of symbols comprises:
    replacing flexible symbols indicated by the semi-static slot configuration with symbol types for respective symbols indicated by the dynamic slot configuration; and
    maintaining symbols other than the replaced flexible symbols with symbol types indicated by the semi-static slot configuration.
5. The method of claim 4, further comprising:
    replacing symbols indicated by the semi-static slot configuration with corresponding reserved symbol types indicated by the dynamic slot configuration.
6. The method of claim 3, wherein identifying the symbol type for each of the set of symbols comprises:
    replacing all symbols indicated by the semi-static slot configuration with symbol types for respective symbols indicated by the dynamic slot configuration.
7. The method of claim 1, wherein determining the slot format comprises:
    combining a first portion of symbol types indicated by the first slot format configuration with a second portion of symbol types indicated by the second slot format configuration to obtain the determined slot format, wherein the first slot format configuration is a semi-static slot configuration and wherein the second slot format configuration is a dynamic slot configuration.
8. The method of claim 7, wherein:
    the second portion of symbol types is limited to symbols that correspond to flexible symbols indicated by the semi-static slot configuration.
9. The method of claim 7, wherein:
    the second portion of symbol types is limited to reserved symbols indicated by the dynamic slot configuration.
10. The method of claim 7, wherein:
    the second portion of symbol types comprises all symbols indicated by the dynamic slot configuration.
11. The method of claim 1, wherein identifying the first slot format configuration comprises:
    receiving, from the base station, a semi-static slot configuration indicating a set of downlink symbols, a set of uplink symbols, a set of reserved symbols, and a set of flexible symbols for the first slot.
12. The method of claim 11, wherein:
    the semi-static slot configuration is received via a radio resource control (RRC) message or a broadcast message.
13. The method of claim 11, wherein:
    the semi-static slot configuration indicates one or more sets of symbol types for the set of symbols, each of the one or more sets of symbol types corresponding to a different frequency range.
14. The method of claim 13, wherein:
    each frequency range comprises a bandwidth part (BWP) of a frequency band.
15. The method of claim 13, wherein:
    each frequency range comprises a component carrier (CC) of a frequency band.
16. The method of claim 1, wherein receiving the indication of the second slot format configuration comprises:
    receiving, from the base station, a dynamic slot configuration indicating a set of downlink symbols, a set of uplink symbols, a set of reserved symbols, and a set of blank symbols for the first slot.

17. The method of claim 16, wherein:
the dynamic slot configuration is received via a common physical downlink control channel (PDCCH).

18. The method of claim 17, wherein:
the common PDCCH corresponds to a group of UEs.

19. The method of claim 1, further comprising:
receiving, from a network node, an anchor configuration for a set of slots including the first slot, the anchor configuration indicating a set of anchor slots, a set of soft anchor slots, and a set of non-anchor slots for the set of slots, wherein the determined slot format for the first slot is determined based at least in part on the anchor configuration.

20. The method of claim 19, wherein:
the first slot corresponds to an anchor slot; and
determining the slot format for the first slot comprises determining symbol types for symbols of the first slot based on only the first slot format configuration.

21. The method of claim 19, further comprising:
receiving an indication that the first slot is to be converted from an anchor slot to a non-anchor slot, wherein, as a non-anchor slot, symbol types of the first slot are determined based on at least in part on the second slot format configuration.

22. The method of claim 21, wherein:
the indication is received via downlink control information (DCI) or a media access control (MAC) control element (MAC-CE).

23. The method of claim 21, wherein:
the indication is enabled based at least in part on a semi-persistent activation message or a timer.

24. The method of claim 19, wherein:
the first slot corresponds to a non-anchor slot; and
determining the slot format for the first slot comprises determining symbol types for symbols of the first slot based at least in part on the second slot format configuration.

25. A method for wireless communication, comprising:
transmitting, by a base station, a first slot format configuration for a first slot for communication with a user equipment (UE);
transmitting, to the UE, an indication of a second slot format configuration for the first slot; and
communicating with the UE over a set of symbols of the first slot according a slot format based at least in part on the first slot format configuration and the second slot format configuration.

26. The method of claim 25, wherein:
the first slot format configuration is a semi-static slot configuration; and
the second slot format configuration is a dynamic slot configuration.

27. The method of claim 26, further comprising:
identifying a symbol type for each of the set of symbols based at least in part on the semi-static and dynamic slot configurations.

28. The method of claim 25, wherein transmitting the first slot format configuration comprises:
transmitting a semi-static slot configuration indicating a set of downlink symbols, a set of uplink symbols, a set of reserved symbols, and a set of flexible symbols for the first slot.

29. The method of claim 28, wherein:
the semi-static slot configuration is transmitted via a radio resource control (RRC) message or a broadcast message.

30. The method of claim 28, wherein:
the semi-static slot configuration indicates one or more sets of symbol types for the set of symbols, each of the one or more sets of symbol types corresponding to a different frequency range.

31. The method of claim 30, wherein:
each frequency range comprises a bandwidth part (BWP) of a frequency band.

32. The method of claim 30, wherein:
each frequency range comprises a component carrier (CC) of a frequency band.

33. The method of claim 25, wherein transmitting the indication of the second slot format configuration comprises:
transmitting a dynamic slot configuration indicating a set of downlink symbols, a set of uplink symbols, a set of reserved symbols, and a set of blank symbols for the first slot.

34. The method of claim 33, wherein:
the dynamic slot configuration is transmitted via a common physical downlink control channel (PDCCH).

35. The method of claim 34, wherein:
the common PDCCH corresponds to a group of UEs.

36. The method of claim 25, further comprising:
receiving, from a network node, an anchor configuration for a set of slots including the first slot, the anchor configuration indicating a set of anchor slots, a set of soft anchor slots, and a set of non-anchor slots for the set of slots, wherein the slot format for the first slot is based at least in part on the anchor configuration.

37. The method of claim 36, wherein:
the first slot corresponds to an anchor slot; and
the slot format for the first slot is based on only symbol types for the set of symbols as indicated by the first slot format configuration.

38. The method of claim 36, wherein:
the first slot corresponds to a soft anchor slot; and
the slot format for the first slot is based on only symbol types for the set of symbols as indicated by the second slot format configuration.

39. The method of claim 38, further comprising:
indicating one or more soft anchor slots via downlink control information (DCI) or a media access control (MAC) control element (MAC-CE).

40. The method of claim 36, wherein:
the first slot corresponds to a non-anchor slot; and
the slot format for the first slot is based on only flexible or reserved symbol types for a subset of symbols as indicated by the first slot format configuration that are replaced with respective symbol types as indicated by the second slot format configuration.

41. An apparatus for wireless communication, comprising:
means for identifying, by a user equipment (UE), a first slot format configuration for a first slot for communication with a base station;
means for receiving, from the base station, an indication of a second slot format configuration for the first slot;
means for determining a slot format for the first slot based at least in part on the first and second slot format configurations; and
means for communicating with the base station over a set of symbols of the first slot according to the determined slot format.

42. An apparatus for wireless communication, comprising:
- means for transmitting, by a base station, a first slot format configuration for a first slot for communication with a user equipment (UE);
- means for transmitting, to the UE, an indication of a second slot format configuration for the first slot; and
- means for communicating with the UE over a set of symbols of the first slot according a slot format based at least in part on the first slot format configuration and the second slot format configuration.

43. An apparatus for wireless communication, comprising:
- a processor;
- memory coupled with the processor; and
- instructions stored in the memory and operable, when executed by the processor, to cause the apparatus to:
  - identify a first slot format configuration for a first slot for communication with a base station;
  - receive, from the base station, an indication of a second slot format configuration for the first slot;
  - determine a slot format for the first slot based at least in part on the first and second slot format configurations; and
  - communicate with the base station over a set of symbols of the first slot according to the determined slot format.

44. The apparatus of claim 43, wherein:
- the first slot format configuration is a semi-static slot configuration; and
- the second slot format configuration is a dynamic slot configuration.

45. The apparatus of claim 44, wherein the instructions are further executable by the processor to:
- identify a symbol type for each of the set of symbols based at least in part on the semi-static slot configuration and the dynamic slot configuration.

46. The apparatus of claim 45, wherein the instructions are further executable by the processor to:
- replace flexible symbols indicated by the semi-static slot configuration with symbol types for respective symbols indicated by the dynamic slot configuration; and
- maintain symbols other than the replaced flexible symbols with slot types indicated by the semi-static slot configuration.

47. The apparatus of claim 43, wherein the instructions are further executable by the processor to:
- combine a first portion of symbol types indicated by the first slot format configuration with a second portion of symbol types indicated by the second slot format configuration to obtain the determined slot format, wherein the first slot format configuration is a semi-static slot configuration and wherein the second slot format configuration is a dynamic slot configuration.

48. The apparatus of claim 47, wherein:
- the second portion of symbol types is limited to symbols that correspond to flexible symbols indicated by the semi-static slot configuration.

49. The apparatus of claim 43, wherein the instructions to identify the first slot format configuration are further executable by the processor to:
- receive, from the base station, a semi-static slot configuration indicating a set of downlink symbols, a set of uplink symbols, a set of reserved symbols, and a set of flexible symbols for the first slot.

50. The apparatus of claim 49, wherein:
- the semi-static slot configuration is received via a radio resource control (RRC) message or a broadcast message.

51. The apparatus of claim 49, wherein:
- the semi-static slot configuration indicates one or more sets of symbol types for the set of symbols, each of the one or more sets of symbol types corresponding to a different frequency range.

52. The apparatus of claim 51, wherein:
- each frequency range comprises a bandwidth part (BWP) of a frequency band.

53. The apparatus of claim 51, wherein:
- each frequency range comprises a component carrier (CC) of a frequency band.

54. The apparatus of claim 43, wherein the instructions to receive the indication of the second slot format configuration are further executable by the processor to:
- receive, from the base station, a dynamic slot configuration indicating a set of downlink symbols, a set of uplink symbols, a set of reserved symbols, and a set of blank symbols for the first slot.

55. The apparatus of claim 54, wherein:
- the dynamic slot configuration is received via a common physical downlink control channel (PDCCH).

56. The apparatus of claim 55, wherein:
- the common PDCCH corresponds to a group of UEs.

57. An apparatus for wireless communication, comprising:
- a processor;
- memory coupled with the processor; and
- instructions stored in the memory and operable, when executed by the processor, to cause the apparatus to:
  - transmit a first slot format configuration for a first slot for communication with a user equipment (UE);
  - transmit, to the UE, an indication of a second slot format configuration for the first slot; and
  - communicate with the UE over a set of symbols of the first slot according a slot format based at least in part on the first slot format configuration and the second slot format configuration.

58. The apparatus of claim 57, wherein:
- the first slot format configuration is a semi-static slot configuration; and
- the second slot format configuration is a dynamic slot configuration.

59. The apparatus of claim 58, wherein the instructions are further executable by the processor to:
- identify a symbol type for each of the set of symbols based at least in part on the semi-static and dynamic slot configurations.

60. The apparatus of claim 57, wherein the instructions to transmit the first slot format configuration are further executable by the processor to:
- transmit a semi-static slot configuration indicating a set of downlink symbols, a set of uplink symbols, a set of reserved symbols, and a set of flexible symbols for the first slot.

61. The apparatus of claim 60, wherein:
- the semi-static slot configuration is transmitted via a radio resource control (RRC) message or a broadcast message.

62. The apparatus of claim 60, wherein:
- the semi-static slot configuration indicates one or more sets of symbol types for the set of symbols, each of the one or more sets of symbol types corresponding to a different frequency range.

63. The apparatus of claim 62, wherein:

each frequency range comprises a bandwidth part (BWP) of a frequency band.

64. The apparatus of claim 62, wherein:

each frequency range comprises a component carrier (CC) of a frequency band.

65. The apparatus of claim 57, wherein the instructions to transmit the indication of the second slot format configuration are further executable by the processor to:

transmit a dynamic slot configuration indicating a set of downlink symbols, a set of uplink symbols, a set of reserved symbols, and a set of blank symbols for the first slot.

66. The apparatus of claim 65, wherein:

the dynamic slot configuration is transmitted via a common physical downlink control channel (PDCCH).

67. The apparatus of claim 66, wherein:

the common PDCCH corresponds to a group of UEs.

68. A non-transitory computer readable medium storing code for wireless communication, the code comprising instructions executable by a processor to:

identify, by a user equipment (UE), a first slot format configuration for a first slot for communication with a base station;

receive, from the base station, an indication of a second slot format configuration for the first slot;

determine a slot format for the first slot based at least in part on the first and second slot format configurations; and communicate with the base station over a set of symbols of the first slot according to the determined slot format.

69. A non-transitory computer readable medium storing code for wireless communication, the code comprising instructions executable by a processor to:

transmit, by a base station, a first slot format configuration for a first slot for communication with a user equipment (UE);

transmit, to the UE, an indication of a second slot format configuration for the first slot; and communicate with the UE over a set of symbols of the first slot according a slot format based at least in part on the first slot format configuration and the second slot format configuration.

* * * * *